United States Patent
Jeon et al.

(10) Patent No.: US 9,350,440 B2
(45) Date of Patent: May 24, 2016

(54) METHOD AND APPARATUS FOR SUBSET NETWORK CODING WITH MULTIPLE ANTENNAS BY RELAY NODE IN WIRELESS COMMUNICATION SYSTEM

(71) Applicants: LG ELECTRONICS INC., Seoul (KR); RESEARCH & BUSINESS FOUNDATION SUNGKYUNKWAN UNIVERSITY, Suwon-si, Gyeonggi-do (KR)

(72) Inventors: Youngjin Jeon, Seoul (KR); Dongin Kim, Seongnam-si (KR); Wan Choi, Seoul (KR); Hanbyul Seo, Anyang-si (KR)

(73) Assignees: LG ELECTRONICS INC., Seoul (KR); RESEARCH & BUSINESS FOUNDATION SUNGKYUNKWAN UNIVERSITY, Suwon-Si (KR)

( * ) Notice: Subject to any disclaimer, the term of this patent is extended or adjusted under 35 U.S.C. 154(b) by 43 days.

(21) Appl. No.: 14/391,678

(22) PCT Filed: Nov. 8, 2012

(86) PCT No.: PCT/KR2012/009394
§ 371 (c)(1),
(2) Date: Oct. 9, 2014

(87) PCT Pub. No.: WO2014/014164
PCT Pub. Date: Jan. 23, 2014

(65) Prior Publication Data
US 2015/0103731 A1    Apr. 16, 2015

Related U.S. Application Data

(60) Provisional application No. 61/671,784, filed on Jul. 15, 2012.

(51) Int. Cl.
*H04B 7/155* (2006.01)
*H04B 7/02* (2006.01)
(Continued)

(52) U.S. Cl.
CPC ............ *H04B 7/15521* (2013.01); *H04B 7/026* (2013.01); *H04B 7/0452* (2013.01); *H04B 7/0456* (2013.01); *H04J 11/00* (2013.01); *H04L 1/004* (2013.01); *H04L 5/0007* (2013.01)

(58) Field of Classification Search
None
See application file for complete search history.

(56) References Cited

U.S. PATENT DOCUMENTS

2011/0176474 A1* 7/2011 Saito et al. .................... 370/315
2011/0294415 A1   12/2011 Jeon et al.
(Continued)

FOREIGN PATENT DOCUMENTS

KR   10-2010-0064191 A    6/2010
KR   10-2010-0110731 A    10/2010
(Continued)

OTHER PUBLICATIONS

Author Unknown, Application of network coding in LTE-advanced relay, Submission No. R1-082327 to 3GPP TSG RAN WG1 Meeting No. 53bis, pp. 1-4, Jun. 30, 2008.*
Author Unknown, Applications of network coding in LTE-A, Submission No. R1-084130 to 3GPP TSG RAN WG1 Meeting No. 55, pp. 1-8, Nov. 14, 2008.*
(Continued)

*Primary Examiner* — Christopher Crutchfield
(74) *Attorney, Agent, or Firm* — Birch, Stewart, Kolasch & Birch, LLP

(57) ABSTRACT

A method for network coding by a relay node in a wireless communication system is disclosed. The method comprises: receiving an information associated with channel estimation from a base station, determining a number of subset for network coding based on the information associated with channel estimation, receiving at least one codeword from at least one user equipment, and generating re-encoded codeword by network coding based on the number of subset, wherein the number of subset is calculated based on a first outage probability and a second outage probability, and wherein the first outage probability is outage probability of the user Equipment to the base station, and the second outage probability is outage probability of the relay node to the base station.

9 Claims, 19 Drawing Sheets

(51) Int. Cl.
*H04B 7/04* (2006.01)
*H04J 11/00* (2006.01)
*H04L 1/00* (2006.01)
*H04L 5/00* (2006.01)

(56) References Cited

U.S. PATENT DOCUMENTS

| | | | |
|---|---|---|---|
| 2012/0020279 A1 | 1/2012 | Kim et al. | |
| 2012/0120821 A1* | 5/2012 | Kazmi et al. | 370/252 |
| 2012/0257695 A1* | 10/2012 | Li et al. | 375/340 |
| 2013/0064174 A1 | 3/2013 | Kim et al. | |
| 2013/0336195 A1 | 12/2013 | Seo et al. | |
| 2014/0086283 A1* | 3/2014 | Liu et al. | 375/211 |

FOREIGN PATENT DOCUMENTS

| | | |
|---|---|---|
| KR | 10-2011-0088458 A | 8/2011 |
| KR | 10-2012-0041649 A | 5/2012 |

OTHER PUBLICATIONS

Author Unknown, Network coding application in transparent & non-transparent relay in LTE advanced system, Submission No. R1-091413 to 3GPP TSG RAN WG1 Meeting No. 56bis, pp. 1-8, Mar. 27, 2009.*

Author Unknown, An Improved Forward Scheme for L2 Relay system with Parity-Check based Network Coding in UL, Submission No. R1-092152 to 3GPP TSG RAN WG1 Meeting No. 57, pp. 1-4, May 8, 2009.*

H. Hamdoun, P. Loskot, Implementing Network Coding in LTE and LTE-A, pp. 1-3, Jan. 2012.*

Z. Li, W. Wang, A Network Coding Scheme for the Multiple Access Full-Duplex Relay Networks, Proceedings or the 6th International ICST Conference on Communications and Networking in China, pp. 1132-1136, 2011.*

D. Vukobratovic, C. Khirallah, V. Stankovic and J. Thompson, Random Network Coding for Multimedia Delivery over LTE-Advanced, proceedings of the 2012 IEEE International Conference on Multimedia and Expo, pp. 200-205, Jul. 13, 2012.*

* cited by examiner (a) contol - plane protocol stack (b) user - plane protocol stack

METHOD AND APPARATUS FOR SUBSET NETWORK CODING WITH MULTIPLE ANTENNAS BY RELAY NODE IN WIRELESS COMMUNICATION SYSTEM

CROSS REFERENCE TO RELATED APPLICATIONS

This application is the National Phase of PCT/KR2012/009394 filed on Nov. 8, 2012, which claims priority under 35 U.S.C. 119(e) to U.S. Provisional Application No. 61/671,784 filed on Jul. 15, 2012, all of which are hereby expressly incorporated by reference into the present application.

TECHNICAL FIELD

The present invention relates to wireless communication systems, and more particularly, to a method and apparatus for subset network coding with multiple antennas by relay node in wireless communication system.

BACKGROUND ART

A 3rd Generation Partnership Project Long Term Evolution (3GPP LTE) communication system, which is an example of a wireless communication system to which the present invention may be applied, will now be described in brief.

FIG. 1 is a diagram schematically showing a network structure of an Evolved Universal Mobile Telecommunications System (E-UMTS) as an exemplary wireless communication system. The E-UMTS system has evolved from the conventional UMTS system and basic standardization thereof is currently underway in the 3GPP. The E-UMTS may be generally referred to as a Long Term Evolution (LTE) system. For details of the technical specifications of the UMTS and E-UMTS, refer to Release 7 and Release 8 of "3rd Generation Partnership Project; Technical Specification Group Radio Access Network".

Referring to FIG. 1, the E-UMTS includes a User Equipment (UE) 120, eNBs (or eNode Bs or base stations) 110a and 110b, and an Access Gateway (AG) which is located at an end of a network (E-UTRAN) and connected to an external network. The eNBs may simultaneously transmit multiple data streams for a broadcast service, a multicast service, and/or a unicast service.

One or more cells may exist per eNB. A cell is set to use one of bandwidths of 1.25, 2.5, 5, 10, and 20 MHz to provide a downlink or uplink transport service to several UEs. Different cells may be set to provide different bandwidths. The eNB controls data transmission and reception for a plurality of UEs. The eNB transmits downlink scheduling information with respect to downlink data to notify a corresponding UE of a time/frequency domain in which data is to be transmitted, coding, data size, and Hybrid Automatic Repeat and reQuest (HARQ)-related information. In addition, the eNB transmits uplink scheduling information with respect to UL data to a corresponding UE to inform the UE of an available time/frequency domain, coding, data size, and HARQ-related information. An interface for transmitting user traffic or control traffic may be used between eNBs. A Core Network (CN) may include the AG, a network node for user registration of the UE, and the like. The AG manages mobility of a UE on a Tracking Area (TA) basis, wherein one TA includes a plurality of cells.

Although wireless communication technology has been developed up to LTE based on Wideband Code Division Multiple Access (WCDMA), the demands and expectations of users and providers continue to increase. In addition, since other radio access technologies continue to be developed, new technology is required to secure competitiveness in the future. For example, decrease of cost per bit, increase of service availability, flexible use of a frequency band, simple structure, open interface, and suitable power consumption by a UE are required.

DISCLOSURE

Technical Problem

An object of the present invention devised to solve the problem lies in providing a method and apparatus for subset network coding with multiple antennas by relay node in wireless communication system.

Technical Solution

The object of the present invention can be achieved by providing a method for network coding by a relay node in a wireless communication system, the method comprising: receiving an information associated with channel estimation from a base station; determining a number of subset for network coding based on the information associated with channel estimation; receiving at least one codeword from at least one user equipment; and generating re-encoded codeword by network coding based on the number of subset, wherein the number of subset is calculated based on a first outage probability and a second outage probability, and wherein the first outage probability is outage probability of the user Equipment to the base station, and the second outage probability is outage probability of the relay node to the base station.

Preferably, the information associated with channel estimation is channel side information.

Preferably, the number of subset is determined by using numerical search. Further, the number of subset is determined based on the following Equation 1:

$$\min_{1 \le l \le M} [P(\text{out})_l] = \min_l \left[ \sum_{i_1+i_2=0}^{n_s-1} f(i_1, i_2 \mid K, n_s) \right] \quad \text{[Equation 1]}$$

(Where l is the number of subset, M is the number of network encoded codewords, p is parity of network encoded codewords, K is the number of user equipment, $$n_s = \left\lfloor \frac{M}{l} \right\rfloor,$$

$$f(i_1, i_2 \mid K, n_s) = \binom{K-1}{i_1}\binom{n_s}{i_2} p_{ds}^{K-1-i_1}(1-p_{ds})^{i_1} p_{dr}^{n_s-i_2}(1-p_{dr})^{i_2},$$

$P_{ds}$ is the first outage probability and $P_{dr}$ is the first outage probability).

Preferably, the first outage probability $P_{ds}$ is defined by following equation 2:

$$p_{ds} = 1 - \sum_{n=0}^{M-1} \frac{1}{n!}\left(\frac{2^{R_c}-1}{\gamma_s}\right)^n \exp\left(-\frac{2^{R_c}-1}{\gamma_s}\right) \quad \text{[Equation 2]}$$

(where, M is the number of network encoded codewords, $R_c=R(K|1)/K$ (bps/Hz) is the channel rate, $\gamma_s$ and $\gamma_s$ is the received SNR per symbol and per relay node symbol).

Preferably, the second outage probability $P_{dr}$ is defined by following equation 3:

$$p_{dr} = 1 - \sum_{n=0}^{M-1} \frac{1}{n!} \left( \frac{2^{R_c/M} - 1}{\gamma_r} \right)^n \exp\left( -\frac{2^{R_c/M} - 1}{\gamma_r} \right) \quad \text{[Equation 3]}$$

(where, M is the number of network encoded codewords, $R_c=R(K+1)/K$ (bps/Hz) is the channel rate, $\gamma_s$ and $\gamma_r$ is the received SNR per symbol and per relay node symbol).

Preferably, the generating re-encoded codeword by network coding based on the following equation 4:

$$p_{j,g} = \sum_{x_i \in C_j} a_{ijg} x_i, \ 1 \le j \le l, \ 1 \le g \le n_s \quad \text{[Equation 4]}$$

(where, $\alpha_{ijg}$ are the network coefficients, and the j-th ($1 \le j \le l$) subset is denoted as $C_j$).

Preferably, the generating re-encoded codeword by subset network coding when the number of subset is not equal to 1.

The object of the present invention can be achieved by providing an apparatus for network coding by a relay node in a wireless communication system, the apparatus comprising: a radio frequency (RF) unit; and a processor, wherein the radio frequency unit is configured to receive an information associated with channel estimation from a base station, and to receive at least one codeword from at least one user equipment, and wherein the processor is configured to determine a number of subset for network coding based on the information associated with channel estimation, and to generate re-encoded codeword by network coding based on the number of subset, and wherein the number of subset is calculated for a first outage probability and a second outage probability, and wherein the first outage probability is outage probability of the user Equipment to the base station, and the second outage probability is outage probability of the relay node to the base station.

Advantageous Effects

According to exemplary embodiments of the present invention, a relay node may effectively determine the size of a transport block transmitted to a relay node in a wireless communication system.

It is to be understood that the advantages that can be obtained by the present invention are not limited to the aforementioned advantage and other advantages which are not mentioned will be apparent from the following description to the person with an ordinary skill in the art to which the present invention pertains.

DESCRIPTION OF DRAWINGS

The accompanying drawings, which are included to provide a further understanding of the invention, illustrate embodiments of the invention and together with the description serve to explain the principle of the invention.

In the drawings.

MODE FOR INVENTION

Reference will now be made in detail to the preferred embodiments of the present invention, examples of which are illustrated in the accompanying drawings.

Although the embodiments of the present invention are described based on the LTE system and the LTE Advanced (LTE-A) system, the embodiments of the present invention are applicable to any communication system corresponding to the aforementioned definition. In addition, although the embodiments of the present invention are described based on a Frequency Division Duplex (FDD) scheme as an example, the embodiments of the present invention may be easily modified and applied to a Half-Duplex FDD (H-FDD) scheme or a Time Division Duplex (TDD) scheme.

Figure 1:
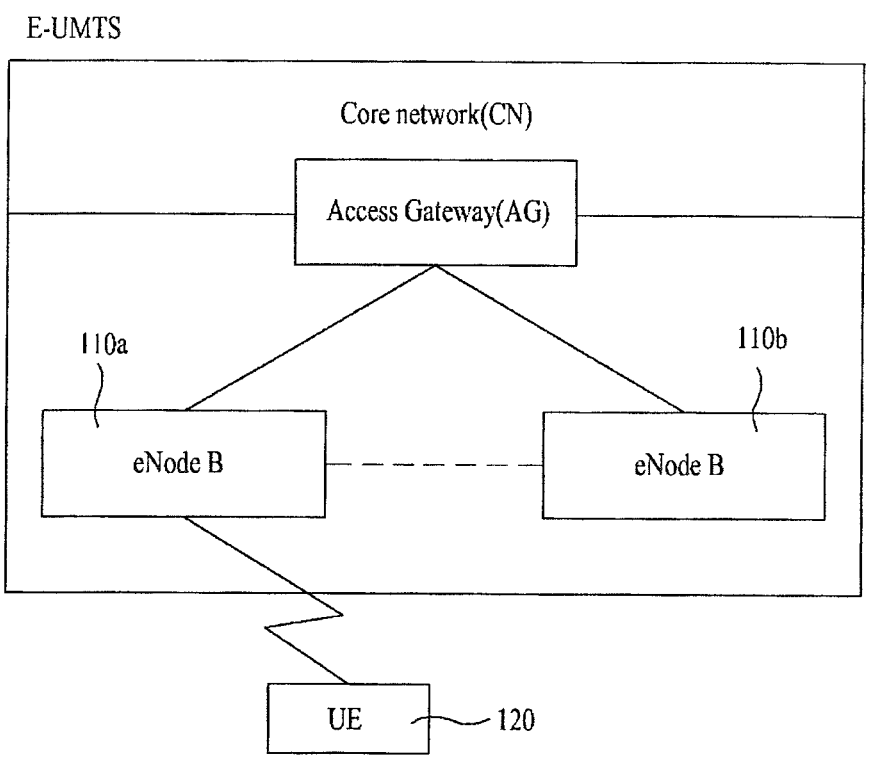
FIG. 1 is a diagram schematically showing a network structure of an E-UMTS as an exemplary wireless communication system.
Figure 2:
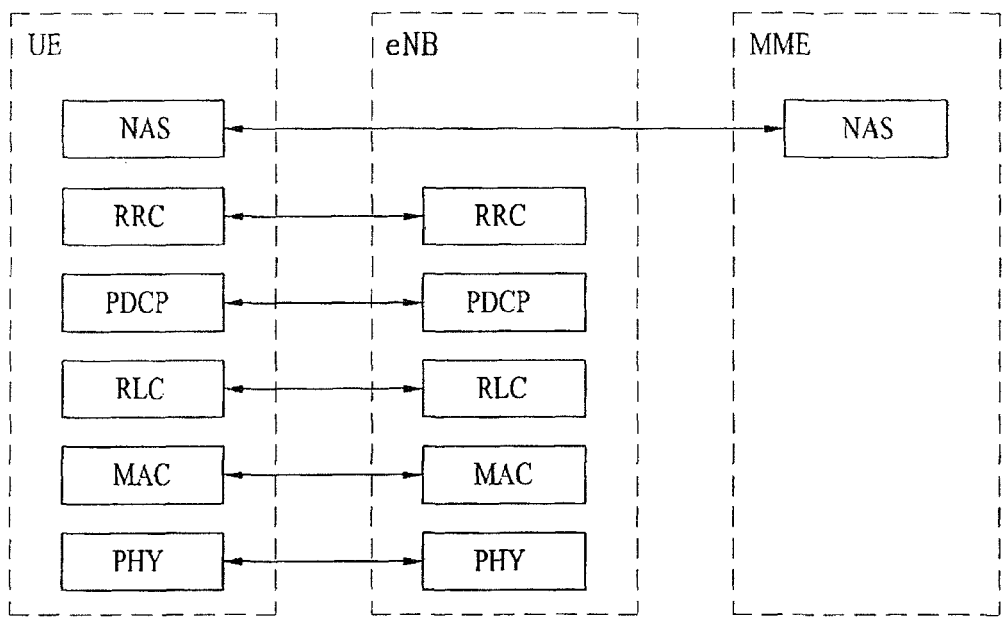
FIG. 2 is a diagram showing structures of a control plane and a user plane of a radio interface protocol between a UE and E-UTRAN based on the 3GPP radio access network standard.
Figure 2:
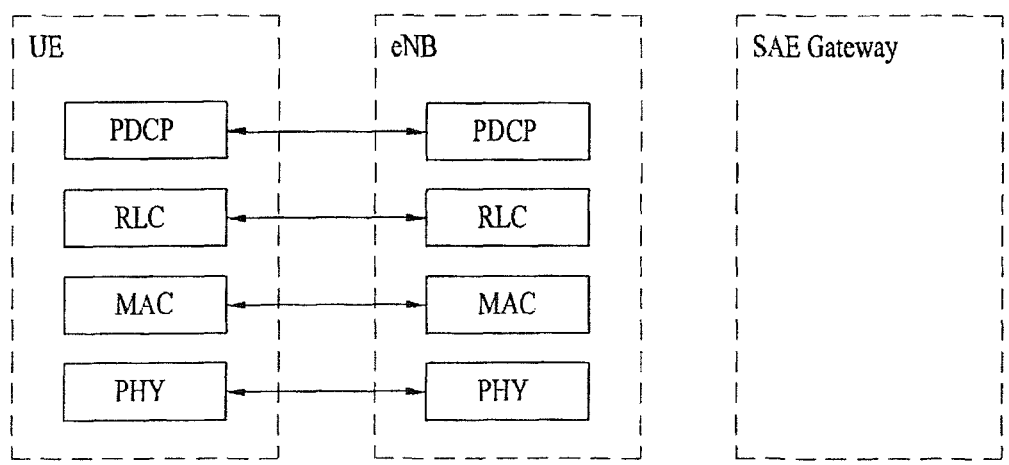

FIG. 2 is a diagram showing structures of a control plane and a user plane of a radio interface protocol between a UE and E-UTRAN based on the 3GPP radio access network standard. The control plane refers to a path used for transmitting control messages which are used in the UE and the network to manage a call. The user plane refers to a path used for transmitting data generated in an application layer, e.g., voice data or Internet packet data.

A physical (PHY) layer of a first layer provides an information transfer service to an upper layer using a physical channel. The PHY layer is connected to a Medium Access Control (MAC) layer of an upper layer via a transport channel. Data is transported between the MAC layer and the PHY layer via the transport channel. Data is also transported between a physical layer of a transmitting side and a physical layer of a receiving side via a physical channel. The physical channel uses time and frequency as radio resources. Specifically, the physical channel is modulated using an Orthogonal Frequency Division Multiple Access (OFDMA) scheme in downlink and is modulated using a Single-Carrier Frequency Division Multiple Access (SC-FDMA) scheme in uplink.

A Medium Access Control (MAC) layer of a second layer provides a service to a Radio Link Control (RLC) layer of an upper layer via a logical channel. The RLC layer of the second layer supports reliable data transmission. The function of the RLC layer may be implemented by a functional block within the MAC. A Packet Data Convergence Protocol (PDCP) layer of the second layer performs a header compression function to reduce unnecessary control information for efficient transmission of an Internet Protocol (IP) packet such as IPv4 or IPv6 in a radio interface having a relatively narrow bandwidth.

A Radio Resource Control (RRC) layer located at the bottommost portion of a third layer is defined only in the control plane. The RRC layer controls logical channels, transport channels, and physical channels in relation to configuration, re-configuration, and release of radio bearers. The radio bearer refers to a service provided by the second layer to transmit data between the UE and the network. To this end, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A Non-Access Stratum (NAS) layer located at an upper level of the RRC layer performs functions such as session management and mobility management.

One cell of the eNB is set to use one of bandwidths such as 1.25, 2.5, 5, 10, 15, and 20 MHz to provide a downlink or uplink transmission service to UEs. Different cells may be set to provide different bandwidths.

Downlink transport channels for data transmission from the network to the UE include a Broadcast Channel (BCH) for transmitting system information, a Paging Channel (PCH) for transmitting paging messages, and a downlink Shared Channel (SCH) for transmitting user traffic or control messages. User traffic or control messages of a downlink multicast or broadcast service may be transmitted through the downlink SCH or may be transmitted through an additional downlink Multicast Channel (MCH). Meanwhile, uplink transport channels for data transmission from the UE to the network include a Random Access Channel (RACH) for transmitting initial control messages and an uplink SCH for transmitting user traffic or control messages. Logical channels, which are located at an upper level of the transport channels and are mapped to the transport channels, include a Broadcast Control Channel (BCCH), a Paging Control Channel (PCCH), a Common Control Channel (CCCH), a Multicast Control Channel (MCCH), and a Multicast Traffic Channel (MTCH).

Figure 3:
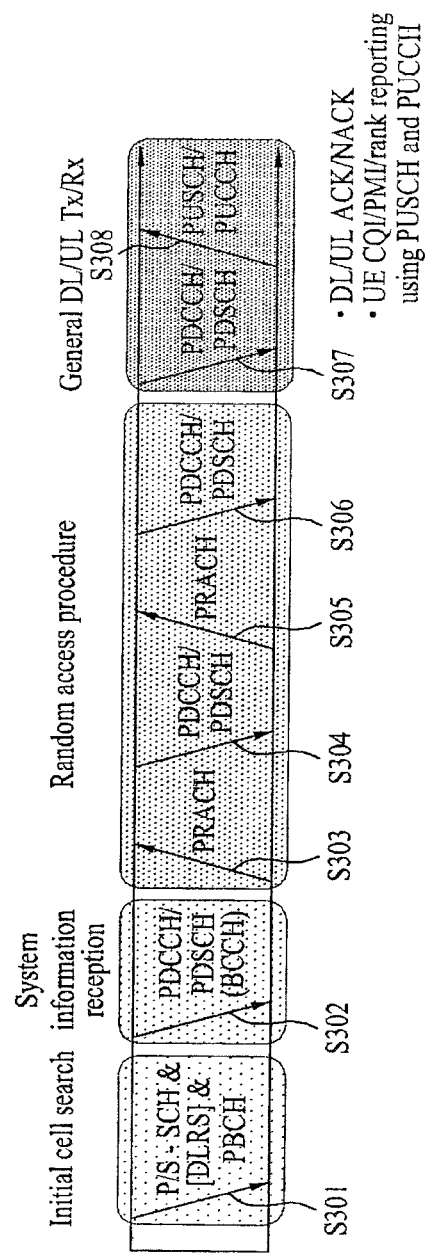
FIG. 3 is a diagram showing physical channels used in a 3GPP system and a general signal transmission method using the same.

FIG. 3 is a diagram showing physical channels used in a 3GPP system and a general signal transmission method using the same.

A UE performs an initial cell search operation such as establishment of synchronization with an eNB when power is turned on or the UE enters a new cell (step S301). The UE may receive a Primary Synchronization Channel (P-SCH) and a Secondary Synchronization Channel (S-SCH) from the eNB, establish synchronization with the eNB, and acquire information such as a cell identity (ID). Thereafter, the UE may receive a physical broadcast channel from the eNB to acquire broadcast information within the cell. Meanwhile, the UE may receive a Downlink Reference Signal (DL RS) in the initial cell search step to confirm a downlink channel state.

Upon completion of the initial cell search, the UE may receive a Physical Downlink Control Channel (PDCCH) and a Physical Downlink Shared Channel (PDSCH) according to information included in the PDCCH to acquire more detailed system information (step S302).

Meanwhile, if the UE initially accesses the eNB or if radio resources for signal transmission are not present, the UE may perform a random access procedure (steps S303 to S306) with respect to the eNB. To this end, the UE may transmit a specific sequence through a Physical Random Access Channel (PRACH) as a preamble (steps S303 and S305), and receive a response message to the preamble through the PDCCH and the PDSCH corresponding thereto (steps S304 and S306). In the case of a contention-based RACH, a contention resolution procedure may be additionally performed.

The UE which performs the above procedures may receive a PDCCH/PDSCH (step S307) and transmit a Physical Uplink Shared Channel (PUSCH)/Physical Uplink Control Channel (PUCCH) (step S308) according to a general uplink/downlink signal transmission procedure. The UE receives Downlink Control Information (DCI) through the PDCCH. The DCI includes control information such as resource allocation to the UE and has different formats according to a use purpose.

Meanwhile, control information transmitted by the UE to the eNB through uplink or received by the UE from the eNB through downlink includes a downlink/uplink Acknowledgement/Negative Acknowledgement (ACK/NACK) signal, a Channel Quality Indicator (CQI), a Precoding Matrix Index (PMI), a Rank Indicator (RI), and the like. In the case of the 3GPP LTE system, the UE may transmit the control information such as CQI/PMI/RI through the PUSCH and/or the PUCCH.

Figure 4:
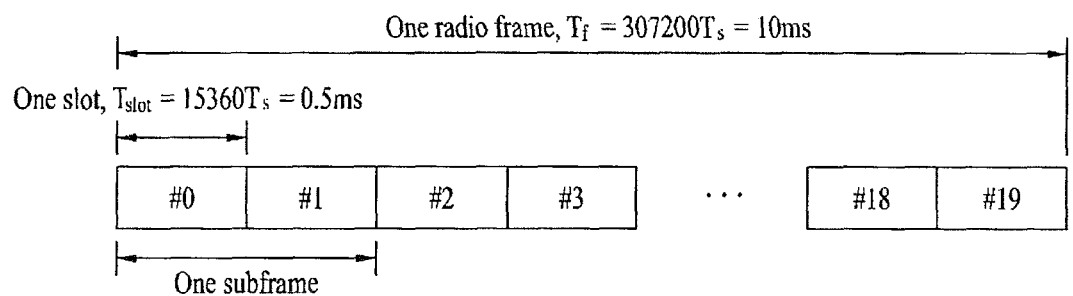
FIG. 4 is a diagram showing the structure of a radio frame used in an LTE system.

FIG. 4 is a diagram showing the structure of a radio frame used in an LTE system.

Referring to FIG. 4, the radio frame has a length of 10 ms (3027200*Ts) and includes 10 subframes each having the same size. Each of the subframes has a length of 1 ms and includes two slots. Each of the slots has a length of 0.5 ms (15360 $T_s$). In this case, $T_s$ denotes a sampling time, and is represented by $T_s=1/(15\ kHz \times 2048)=3.2552 \times 10^{-8}$ (about 33 ns). Each slot includes a plurality of OFDM symbols in a time domain and includes a plurality of Resource Blocks (RBs) in a frequency domain. In the LTE system, one RB includes 12 subcarriers×7 (or 6) OFDM symbols. A Transmission Time Interval (TTI) which is a unit time for data transmission may be determined in units of one or more subframes. The above-described structure of the radio frame is purely exemplary and various modifications may be made in the number of subframes included in a radio frame, the number of slots included in a subframe, or the number of OFDM symbols included in a slot.

Figure 5:
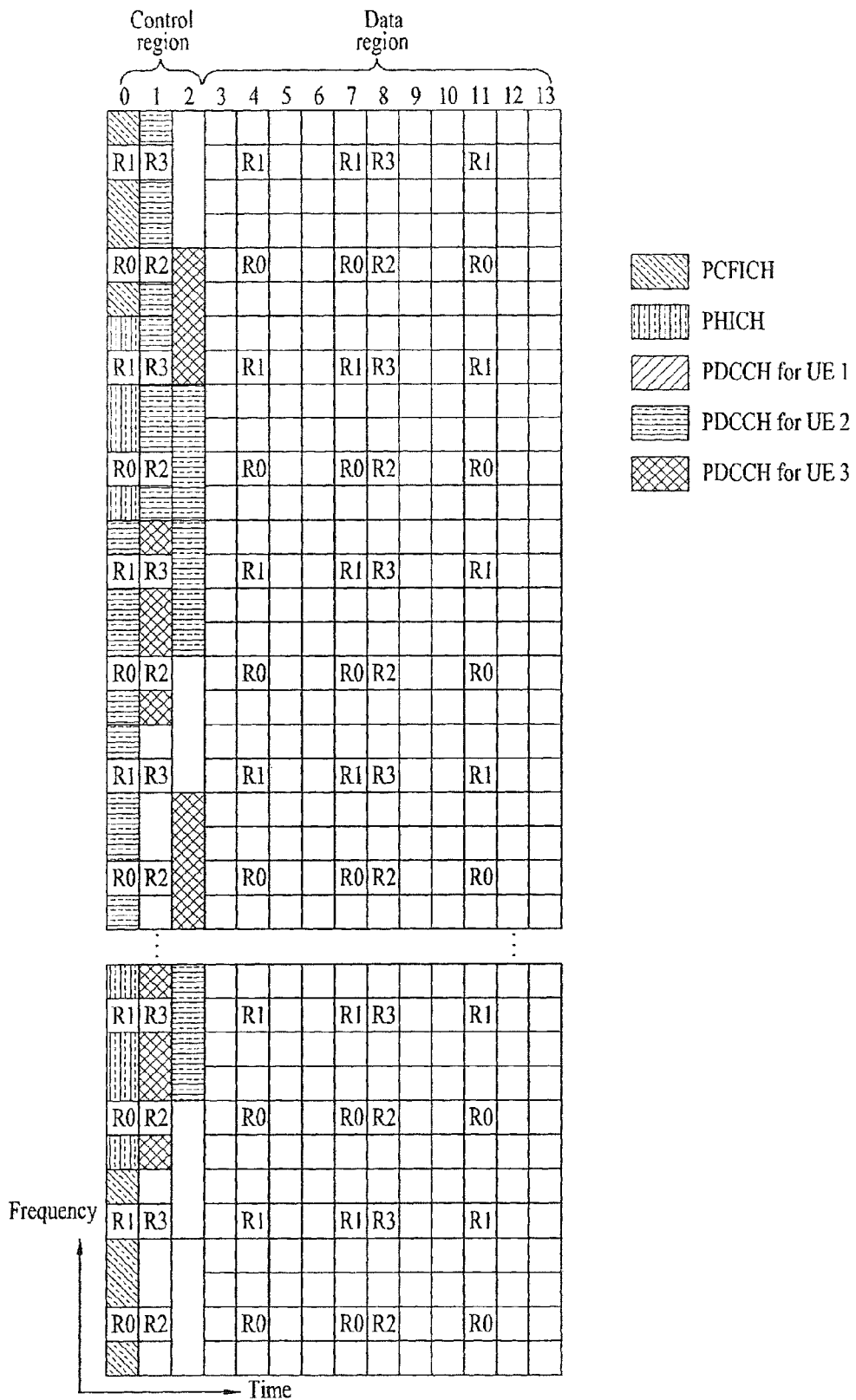
FIG. 5 is a diagram showing a control channel contained in a control region of one subframe in a downlink radio frame.

FIG. 5 is a diagram showing a control channel contained in a control region of one subframe in a downlink radio frame.

Referring to FIG. 5, one subframe includes 14 OFDM symbols. First to third ones of the 14 OFDM symbols may be used as a control region and the remaining OFDM symbols (i.e., 13 to 11 OFDM symbols) may be used as a data region, according to subframe setting. In FIG. 5, R0 to R3 represent reference signals (RSs) or pilot signals for antennas 0 to 3, respectively. The RSs are fixed to a predetermined pattern within the subframe irrespective of the control region and the data region. Control channels are allocated to resources, to which the RS is not allocated, in the control region. Traffic channels are allocated to resources, to which the RS is not allocated, in the data region. The control channels allocated to the control region include a Physical Control Format Indicator Channel (PCFICH), a Physical Hybrid-ARQ Indicator Channel (PHICH), a Physical Downlink Control Channel (PDCCH), etc.

The PCFICH, physical control format indicator channel, informs a UE of the number of OFDM symbols used for the PDCCH per subframe. The PCFICH is located in the first OFDM symbol and is established prior to the PHICH and the PDCCH. The PCFICH is comprised of 4 Resource Element Groups (REGs) and each of the REGs is distributed in the control region based on a cell ID. One REG includes 4 Resource Elements (REs). The RE indicates a minimum physical resource defined as one subcarrier×one OFDM symbol. The PCFICH value indicates values of 1 to 3 or values of 2 to 4 depending on bandwidth and is modulated by Quadrature Phase Shift Keying (QPSK).

The PHICH, physical Hybrid-ARQ indicator channel, is used to transmit a HARQ ACK/NACK signal for uplink transmission. That is, the PHICH indicates a channel through which downlink ACK/NACK information for uplink HARQ is transmitted. The PHICH includes one REG and is cell-specifically scrambled. The ACK/NACK signal is indicated by 1 bit and is modulated by Binary Phase Shift Keying (BPSK). The modulated ACK/NACK signal is spread by a Spreading Factor (SF)=2 or 4. A plurality of PHICHs mapped to the same resource constitutes a PHICH group. The number of PHICHs multiplexed to the PHICH group is determined depending on the number of SFs. The PHICH (group) is repeated three times to obtain diversity gain in a frequency domain and/or a time domain.

The PDCCH, physical downlink control channel, is allocated to the first n OFDM symbols of a subframe. In this case, n is an integer greater than 1 and is indicated by the PCFICH. The PDCCH is comprised of one or more control Channel Elements (CCEs). The PDCCH informs each UE or UE group of information associated with resource allocation of a Paging Channel (PCH) and a Downlink-Shared Channel (DL-SCH), uplink scheduling grant, Hybrid Automatic Repeat Request (HARQ) information, etc. Therefore, an eNB and a UE transmit and receive data other than specific control information or specific service data through the PDSCH.

Information indicating to which UE or UEs PDSCH data is transmitted, information indicating how UEs receive PDSCH data, and information indicating how UEs perform decoding are contained in the PDCCH. For example, it is assumed that a specific PDCCH is CRC-masked with a Radio Network Temporary Identity (RNTI) 'A', and information about data, that is transmitted using radio resources 'B' (e.g., a frequency location) and transport format information 'C' (e.g., a transmission block size, a modulation scheme, coding information, etc.), is transmitted through a specific subframe. In this case, a UE located in a cell monitors the PDCCH using its own RNTI information. If one or more UEs having the RNTI 'A' are present, the UEs receive the PDCCH and receive the PDSCH indicated by 'B' and 'C' through the received PDCCH information.

Figure 6:
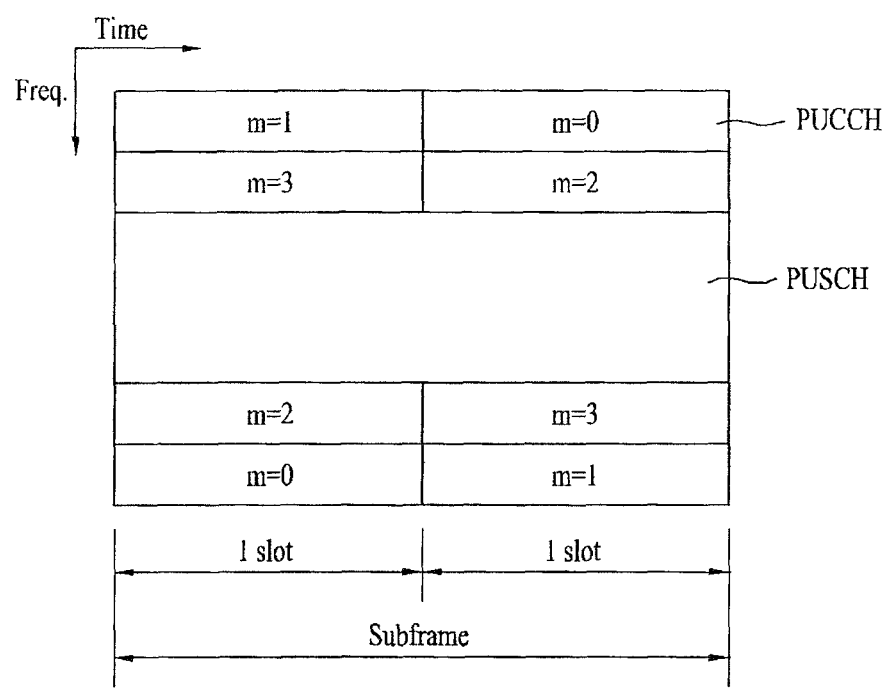
FIG. 6 is a diagram showing the structure of an uplink subframe used in an LTE system.

FIG. 6 is a diagram showing the structure of an uplink subframe used in an LTE system.

Referring to FIG. 6, the uplink subframe may be divided into an area to which a Physical Uplink Control Channel (PUCCH) for transmitting control information is allocated and an area to which a Physical Uplink Shared Channel (PUSCH) for transmitting user data is allocated. A middle portion of the subframe is allocated to the PUSCH, and both portions of a data area in a frequency domain are allocated to the PUCCH. The control information transmitted through the PUCCH includes an ACK/NACK signal used for HARQ, a CQI indicating a downlink channel state, an RI for MIMO, a Scheduling Request (SR) indicating an uplink resource allocation request, and the like. The PUCCH for one UE uses one RB occupying different frequencies at each slot within a subframe. That is, 2 RBs allocated to the PUCCH are frequency-hopped at a slot boundary. FIG. 6 illustrates allocation of PUCCH having m=0, PUCCH having m=1, PUCCH having m=2, and PUCCH having m=3 to a subframe.

Meanwhile, in order to decode data transmitted through the PDSCH, a UE should determine the modulation order and Transport Block Size (TBS). To this end, the UE, reads fields of a 5-bit Modulation and Coding Scheme (MCS) index $I_{MCS}$ contained in a Downlink Control Information (DCI) transmitted through the PDCCH. One field of $I_{MCS}$ is mapped, as listed in the following Table 1, to one modulation order $Q_m$ and one $I_{TBS}$ (where $I_{TBS}$ is one of factor determining the TBS).

TABLE 1

| MCS Index $I_{MCS}$ | Modulation Order $Q_m$ | TBS Index $I_{TBS}$ |
| --- | --- | --- |
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |
| 29 | 2 | reserved |
| 30 | 4 | |
| 31 | 6 | |

The UE omits decoding of a transport block in initial transmission if an effective channel code rate is higher than 0.930, and informs an upper layer that decoding of a transport block has failed. The effective channel code rate may be defined as a value obtained by dividing the number of downlink information bits (including CRC bits) by the number of physical channel bits transmitted on the PDSCH.

The TBS is defined by $I_{TBS}$ and the number $N_{PRB}$ of RBs allocated, as listed in the following Table 2.

TABLE 2

| $I_{TBS}$ | \multicolumn{10}{c}{$N_{PRB}$} |
| --- | --- | --- | --- | --- | --- | --- | --- | --- | --- | --- |
| | 1 | 2 | 3 | 4 | 5 | 6 | 7 | 8 | 9 | 10 |
| 0 | 16 | 32 | 56 | 88 | 120 | 152 | 176 | 208 | 224 | 256 |
| 1 | 24 | 56 | 88 | 144 | 176 | 208 | 224 | 256 | 328 | 344 |
| 2 | 32 | 72 | 144 | 176 | 208 | 256 | 296 | 328 | 376 | 424 |
| 3 | 40 | 104 | 176 | 208 | 256 | 328 | 392 | 440 | 504 | 568 |
| 4 | 56 | 120 | 208 | 256 | 328 | 408 | 488 | 552 | 632 | 696 |
| 5 | 72 | 144 | 224 | 328 | 424 | 504 | 600 | 680 | 776 | 872 |
| 6 | 328 | 176 | 256 | 392 | 504 | 600 | 712 | 808 | 936 | 1032 |
| 7 | 104 | 224 | 328 | 472 | 584 | 712 | 840 | 968 | 1096 | 1224 |
| 8 | 120 | 256 | 392 | 536 | 680 | 808 | 968 | 1096 | 1256 | 1384 |
| 9 | 136 | 296 | 456 | 616 | 776 | 936 | 1096 | 1256 | 1416 | 1544 |
| 10 | 144 | 328 | 504 | 680 | 872 | 1032 | 1224 | 1384 | 1544 | 1736 |
| 11 | 176 | 376 | 584 | 776 | 1000 | 1192 | 1384 | 1608 | 1800 | 2024 |
| 12 | 208 | 440 | 680 | 904 | 1128 | 1352 | 1608 | 1800 | 2024 | 2280 |
| 13 | 224 | 488 | 744 | 1000 | 1256 | 1544 | 1800 | 2024 | 2280 | 2536 |
| 14 | 256 | 552 | 840 | 1128 | 1416 | 1736 | 1992 | 2280 | 2600 | 2856 |
| 15 | 280 | 600 | 904 | 1224 | 1544 | 1800 | 2152 | 2472 | 2728 | 3112 |
| 16 | 328 | 632 | 968 | 1288 | 1608 | 1928 | 2280 | 2600 | 2984 | 3240 |
| 17 | 336 | 696 | 1064 | 1416 | 1800 | 2152 | 2536 | 2856 | 3240 | 3624 |
| 18 | 376 | 776 | 1160 | 1544 | 1992 | 2344 | 2792 | 3112 | 3624 | 4008 |
| 19 | 408 | 840 | 1288 | 1736 | 2152 | 2600 | 2984 | 3496 | 3880 | 4264 |
| 20 | 440 | 904 | 1384 | 1864 | 2344 | 2792 | 3240 | 3752 | 4136 | 4584 |
| 21 | 488 | 1000 | 1480 | 1992 | 2472 | 2984 | 3496 | 4008 | 4584 | 4968 |
| 22 | 520 | 1064 | 1608 | 2152 | 2664 | 3240 | 3752 | 4264 | 4776 | 5352 |
| 23 | 552 | 1128 | 1736 | 2280 | 2856 | 3496 | 4008 | 4584 | 5160 | 5736 |
| 24 | 584 | 1192 | 1800 | 2408 | 2984 | 3624 | 4264 | 4968 | 5544 | 5992 |
| 25 | 616 | 1256 | 1864 | 2536 | 3112 | 3752 | 4392 | 5160 | 5736 | 6200 |
| 26 | 712 | 1480 | 2216 | 2984 | 3752 | 4392 | 5160 | 5992 | 6712 | 7480 |

| $I_{TBS}$ | \multicolumn{10}{c}{$N_{PRB}$} |
| --- | --- | --- | --- | --- | --- | --- | --- | --- | --- | --- |
| | 11 | 12 | 13 | 14 | 15 | 16 | 17 | 18 | 19 | 20 |
| 0 | 288 | 328 | 344 | 376 | 392 | 424 | 456 | 488 | 504 | 536 |
| 1 | 376 | 424 | 456 | 488 | 520 | 568 | 600 | 632 | 680 | 712 |
| 2 | 472 | 520 | 568 | 616 | 648 | 696 | 744 | 776 | 840 | 872 |
| 3 | 616 | 680 | 744 | 808 | 872 | 904 | 968 | 1032 | 1096 | 1160 |
| 4 | 776 | 840 | 904 | 1000 | 1064 | 1128 | 1192 | 1288 | 1352 | 1416 |
| 5 | 968 | 1032 | 1128 | 1224 | 1320 | 1384 | 1480 | 1544 | 1672 | 1736 |
| 6 | 1128 | 1224 | 1352 | 1480 | 1544 | 1672 | 1736 | 1864 | 1992 | 2088 |
| 7 | 1320 | 1480 | 1608 | 1672 | 1800 | 1928 | 2088 | 2216 | 2344 | 2472 |
| 8 | 1544 | 1672 | 1800 | 1928 | 2088 | 2216 | 2344 | 2536 | 2664 | 2792 |
| 9 | 1736 | 1864 | 2024 | 2216 | 2344 | 2536 | 2664 | 2856 | 2984 | 3112 |
| 10 | 1928 | 2088 | 2280 | 2472 | 2664 | 2792 | 2984 | 3112 | 3368 | 3496 |
| 11 | 2216 | 2408 | 2600 | 2792 | 2984 | 3240 | 3496 | 3624 | 3880 | 4008 |
| 12 | 2472 | 2728 | 2984 | 3240 | 3368 | 3624 | 3880 | 4136 | 4392 | 4584 |
| 13 | 2856 | 3112 | 3368 | 3624 | 3880 | 4136 | 4392 | 4584 | 4968 | 5160 |
| 14 | 3112 | 3496 | 3752 | 4008 | 4264 | 4584 | 4968 | 5160 | 5544 | 5736 |
| 15 | 3368 | 3624 | 4008 | 4264 | 4584 | 4968 | 5160 | 5544 | 5736 | 6200 |
| 16 | 3624 | 3880 | 4264 | 4584 | 4968 | 5160 | 5544 | 5992 | 6200 | 6456 |
| 17 | 4008 | 4392 | 4776 | 5160 | 5352 | 5736 | 6200 | 6456 | 6712 | 7224 |
| 18 | 4392 | 4776 | 5160 | 5544 | 5992 | 6200 | 6712 | 7224 | 7480 | 7992 |
| 19 | 4776 | 5160 | 5544 | 5992 | 6456 | 6968 | 7224 | 7736 | 8248 | 8504 |
| 20 | 5160 | 5544 | 5992 | 6456 | 6968 | 7480 | 7992 | 8248 | 8760 | 9144 |
| 21 | 5544 | 5992 | 6456 | 6968 | 7480 | 7992 | 8504 | 9144 | 9528 | 9912 |
| 22 | 5992 | 6456 | 6968 | 7480 | 7992 | 8504 | 9144 | 9528 | 10296 | 10680 |
| 23 | 6200 | 6968 | 7480 | 7992 | 8504 | 9144 | 9912 | 10296 | 11064 | 11448 |
| 24 | 6712 | 7224 | 7992 | 8504 | 9144 | 9912 | 10296 | 11064 | 11448 | 12216 |
| 25 | 6968 | 7480 | 8248 | 8760 | 9528 | 10296 | 10680 | 11448 | 12216 | 12576 |
| 26 | 8248 | 8760 | 9528 | 10296 | 11064 | 11832 | 12576 | 13536 | 14112 | 14688 |

| $I_{TBS}$ | \multicolumn{10}{c}{$N_{PRB}$} |
| --- | --- | --- | --- | --- | --- | --- | --- | --- | --- | --- |
| | 21 | 22 | 23 | 24 | 25 | 26 | 27 | 28 | 29 | 30 |
| 0 | 568 | 600 | 616 | 648 | 680 | 712 | 744 | 776 | 776 | 808 |
| 1 | 744 | 776 | 808 | 872 | 904 | 936 | 968 | 1000 | 1032 | 1064 |
| 2 | 936 | 968 | 1000 | 1064 | 1096 | 1160 | 1192 | 1256 | 1288 | 1320 |
| 3 | 1224 | 1256 | 1320 | 1384 | 1416 | 1480 | 1544 | 1608 | 1672 | 1736 |
| 4 | 1480 | 1544 | 1608 | 1736 | 1800 | 1864 | 1928 | 1992 | 2088 | 2152 |
| 5 | 1864 | 1928 | 2024 | 2088 | 2216 | 2280 | 2344 | 2472 | 2536 | 2664 |
| 6 | 2216 | 2280 | 2408 | 2472 | 2600 | 2728 | 2792 | 2984 | 2984 | 3112 |
| 7 | 2536 | 2664 | 2792 | 2984 | 3112 | 3240 | 3368 | 3368 | 3496 | 3624 |
| 8 | 2984 | 3112 | 3240 | 3368 | 3496 | 3624 | 3752 | 3880 | 4008 | 4264 |
| 9 | 3368 | 3496 | 3624 | 3752 | 4008 | 4136 | 4264 | 4392 | 4584 | 4776 |
| 10 | 3752 | 3880 | 4008 | 4264 | 4392 | 4584 | 4776 | 4968 | 5160 | 5352 |
| 11 | 4264 | 4392 | 4584 | 4776 | 4968 | 5352 | 5544 | 5736 | 5992 | 5992 |

TABLE 2-continued

| | | | | | | | | | |
|---|---|---|---|---|---|---|---|---|---|
| 12 | 4776 | 4968 | 5352 | 5544 | 5736 | 5992 | 6200 | 6456 | 6712 | 6712 |
| 13 | 5352 | 5736 | 5992 | 6200 | 6456 | 6712 | 6968 | 7224 | 7480 | 7736 |
| 14 | 5992 | 6200 | 6456 | 6968 | 7224 | 7480 | 7736 | 7992 | 8248 | 8504 |
| 15 | 6456 | 6712 | 6968 | 7224 | 7736 | 7992 | 8248 | 8504 | 8760 | 9144 |
| 16 | 6712 | 7224 | 7480 | 7736 | 7992 | 8504 | 8760 | 9144 | 9528 | 9912 |
| 17 | 7480 | 7992 | 8248 | 8760 | 9144 | 9528 | 9912 | 10296 | 10296 | 10680 |
| 18 | 8248 | 8760 | 9144 | 9528 | 9912 | 10296 | 10680 | 11064 | 11448 | 11832 |
| 19 | 9144 | 9528 | 9912 | 10296 | 10680 | 11064 | 11448 | 12216 | 12576 | 12960 |
| 20 | 9912 | 10296 | 10680 | 11064 | 11448 | 12216 | 12576 | 12960 | 13536 | 14112 |
| 21 | 10680 | 11064 | 11448 | 12216 | 12576 | 12960 | 13536 | 14112 | 14688 | 15264 |
| 22 | 11448 | 11832 | 12576 | 12960 | 13536 | 14112 | 14688 | 15264 | 15840 | 16416 |
| 23 | 12216 | 12576 | 12960 | 13536 | 14112 | 14688 | 15264 | 15840 | 16416 | 16992 |
| 24 | 12960 | 13536 | 14112 | 14688 | 15264 | 15840 | 16416 | 16992 | 17568 | 18336 |
| 25 | 13536 | 14112 | 14688 | 15264 | 15840 | 16416 | 16992 | 17568 | 18336 | 19080 |
| 26 | 15264 | 16416 | 16992 | 17568 | 18336 | 19080 | 19848 | 20616 | 21384 | 22152 |

| | $N_{PRB}$ | | | | | | | | | |
|---|---|---|---|---|---|---|---|---|---|---|
| $I_{TBS}$ | 31 | 32 | 33 | 34 | 35 | 36 | 37 | 38 | 39 | 40 |
| 0 | 840 | 872 | 904 | 936 | 968 | 1000 | 1032 | 1032 | 1064 | 1096 |
| 1 | 1128 | 1160 | 1192 | 1224 | 1256 | 1288 | 1352 | 1384 | 1416 | 1416 |
| 2 | 1384 | 1416 | 1480 | 1544 | 1544 | 1608 | 1672 | 1672 | 1736 | 1800 |
| 3 | 1800 | 1864 | 1928 | 1992 | 2024 | 2088 | 2152 | 2216 | 2280 | 2344 |
| 4 | 2216 | 2280 | 2344 | 2408 | 2472 | 2600 | 2664 | 2728 | 2792 | 2856 |
| 5 | 2728 | 2792 | 2856 | 2984 | 3112 | 3112 | 3240 | 3368 | 3496 | 3496 |
| 6 | 3240 | 3368 | 3496 | 3496 | 3624 | 3752 | 3880 | 4008 | 4136 | 4136 |
| 7 | 3752 | 3880 | 4008 | 4136 | 4264 | 4392 | 4584 | 4584 | 4776 | 4968 |
| 8 | 4392 | 4584 | 4584 | 4776 | 4968 | 4968 | 5160 | 5352 | 5544 | 5544 |
| 9 | 4968 | 5160 | 5160 | 5352 | 5544 | 5736 | 5736 | 5992 | 6200 | 6200 |
| 10 | 5544 | 5736 | 5736 | 5992 | 6200 | 6200 | 6456 | 6712 | 6712 | 6968 |
| 11 | 6200 | 6456 | 6712 | 6968 | 6968 | 7224 | 7480 | 7736 | 7736 | 7992 |
| 12 | 6968 | 7224 | 7480 | 7736 | 7992 | 8248 | 8504 | 8760 | 8760 | 9144 |
| 13 | 7992 | 8248 | 8504 | 8760 | 9144 | 9144 | 9528 | 9912 | 9912 | 10296 |
| 14 | 8760 | 9144 | 9528 | 9912 | 9912 | 10296 | 10680 | 11064 | 11064 | 11448 |
| 15 | 9528 | 9912 | 10296 | 10296 | 10680 | 11064 | 11448 | 11832 | 11832 | 12216 |
| 16 | 9912 | 10296 | 10680 | 11064 | 11448 | 11832 | 12216 | 12216 | 12576 | 12960 |
| 17 | 11064 | 11448 | 11832 | 12216 | 12576 | 12576 | 13536 | 13536 | 14112 | 14688 |
| 18 | 12216 | 12576 | 12960 | 13536 | 14112 | 14112 | 14688 | 15264 | 15264 | 15840 |
| 19 | 13536 | 13536 | 14112 | 14688 | 15264 | 15264 | 15840 | 16416 | 16992 | 16992 |
| 20 | 14688 | 14688 | 15264 | 15840 | 16416 | 16992 | 16992 | 17568 | 18336 | 18336 |
| 21 | 15840 | 15840 | 16416 | 16992 | 17568 | 18336 | 18336 | 19080 | 19848 | 19848 |
| 22 | 16992 | 16992 | 17568 | 18336 | 19080 | 19080 | 19848 | 20616 | 21384 | 21384 |
| 23 | 17568 | 18336 | 19080 | 19848 | 19848 | 20616 | 21384 | 22152 | 22152 | 22920 |
| 24 | 19080 | 19848 | 19848 | 20616 | 21384 | 22152 | 22920 | 22920 | 23688 | 24496 |
| 25 | 19848 | 20616 | 20616 | 21384 | 22152 | 22920 | 23688 | 24496 | 24496 | 25456 |
| 26 | 22920 | 23688 | 24496 | 25456 | 25456 | 26416 | 27376 | 28336 | 29296 | 29296 |

| | $N_{PRB}$ | | | | | | | | | |
|---|---|---|---|---|---|---|---|---|---|---|
| $I_{TBS}$ | 41 | 42 | 43 | 44 | 45 | 46 | 47 | 48 | 49 | 50 |
| 0 | 1128 | 1160 | 1192 | 1224 | 1256 | 1256 | 1288 | 1320 | 1352 | 1384 |
| 1 | 1480 | 1544 | 1608 | 1608 | 1608 | 1672 | 1736 | 1736 | 1800 | 1800 |
| 2 | 1800 | 1864 | 1928 | 1992 | 2024 | 2088 | 2088 | 2152 | 2216 | 2216 |
| 3 | 2408 | 2472 | 2536 | 2536 | 2600 | 2664 | 2728 | 2792 | 2856 | 2856 |
| 4 | 2984 | 2984 | 3112 | 3112 | 3240 | 3240 | 3368 | 3496 | 3496 | 3624 |
| 5 | 3624 | 3752 | 3752 | 3880 | 4008 | 4008 | 4136 | 4264 | 4392 | 4392 |
| 6 | 4264 | 4392 | 4584 | 4584 | 4776 | 4776 | 4968 | 4968 | 5160 | 5160 |
| 7 | 4968 | 5160 | 5352 | 5352 | 5544 | 5736 | 5736 | 5992 | 5992 | 6200 |
| 8 | 5736 | 5992 | 5992 | 6200 | 6200 | 6456 | 6456 | 6712 | 6968 | 6968 |
| 9 | 6456 | 6712 | 6712 | 6968 | 6968 | 7224 | 7480 | 7480 | 7736 | 7992 |
| 10 | 7224 | 7480 | 7480 | 7736 | 7992 | 7992 | 8248 | 8504 | 8504 | 8760 |
| 11 | 8248 | 8504 | 8760 | 8760 | 9144 | 9144 | 9528 | 9528 | 9912 | 9912 |
| 12 | 9528 | 9528 | 9912 | 9912 | 10296 | 10680 | 10680 | 11064 | 11064 | 11448 |
| 13 | 10680 | 10680 | 11064 | 11448 | 11448 | 11832 | 12216 | 12216 | 12576 | 12960 |
| 14 | 11832 | 12216 | 12216 | 12576 | 12960 | 13536 | 13536 | 14112 | 14112 | 14112 |
| 15 | 12576 | 12960 | 12960 | 13536 | 13536 | 14112 | 14688 | 14688 | 15264 | 15264 |
| 16 | 13536 | 13536 | 14112 | 14112 | 14688 | 14688 | 15264 | 15840 | 15840 | 16416 |
| 17 | 14688 | 15264 | 15264 | 15840 | 16416 | 16416 | 16992 | 17568 | 17568 | 18336 |
| 18 | 16416 | 16416 | 16992 | 17568 | 17568 | 18336 | 18336 | 19080 | 19080 | 19848 |
| 19 | 17568 | 18336 | 18336 | 19080 | 19080 | 19848 | 20616 | 20616 | 21384 | 21384 |
| 20 | 19080 | 19848 | 19848 | 20616 | 20616 | 21384 | 22152 | 22152 | 22920 | 22920 |
| 21 | 20616 | 21384 | 21384 | 22152 | 22920 | 22920 | 23688 | 24496 | 24496 | 25456 |
| 22 | 22152 | 22920 | 22920 | 23688 | 24496 | 24496 | 25456 | 25456 | 26416 | 27376 |
| 23 | 23688 | 24496 | 24496 | 25456 | 25456 | 26416 | 27376 | 27376 | 28336 | 28336 |
| 24 | 25456 | 25456 | 26416 | 26416 | 27376 | 28336 | 28336 | 29296 | 29296 | 30576 |
| 25 | 26416 | 26416 | 27376 | 28336 | 28336 | 29296 | 29296 | 30576 | 31704 | 31704 |
| 26 | 30576 | 30576 | 31704 | 32856 | 32856 | 34008 | 35160 | 35160 | 36696 | 36696 |

TABLE 2-continued

| $I_{TBS}$ | \multicolumn{10}{c}{$N_{PRB}$} |
| --- | --- | --- | --- | --- | --- | --- | --- | --- | --- | --- |
| | 51 | 52 | 53 | 54 | 55 | 56 | 57 | 58 | 59 | 60 |
| 0 | 1416 | 1416 | 1480 | 1480 | 1544 | 1544 | 1608 | 1608 | 1608 | 1672 |
| 1 | 1864 | 1864 | 1928 | 1992 | 1992 | 2024 | 2088 | 2088 | 2152 | 2152 |
| 2 | 2280 | 2344 | 2344 | 2408 | 2472 | 2536 | 2536 | 2600 | 2664 | 2664 |
| 3 | 2984 | 2984 | 3112 | 3112 | 3240 | 3240 | 3368 | 3368 | 3496 | 3496 |
| 4 | 3624 | 3752 | 3752 | 3880 | 4008 | 4008 | 4136 | 4136 | 4264 | 4264 |
| 5 | 4584 | 4584 | 4776 | 4776 | 4776 | 4968 | 4968 | 5160 | 5160 | 5352 |
| 6 | 5352 | 5352 | 5544 | 5736 | 5736 | 5992 | 5992 | 5992 | 6200 | 6200 |
| 7 | 6200 | 6456 | 6456 | 6712 | 6712 | 6712 | 6968 | 6968 | 7224 | 7224 |
| 8 | 7224 | 7224 | 7480 | 7480 | 7736 | 7736 | 7992 | 7992 | 8248 | 8504 |
| 9 | 7992 | 8248 | 8248 | 8504 | 8760 | 8760 | 9144 | 9144 | 9144 | 9528 |
| 10 | 9144 | 9144 | 9144 | 9528 | 9528 | 9912 | 9912 | 10296 | 10296 | 10680 |
| 11 | 10296 | 10680 | 10680 | 11064 | 11064 | 11448 | 11448 | 11832 | 11832 | 12216 |
| 12 | 11832 | 11832 | 12216 | 12216 | 12576 | 12960 | 12960 | 13536 | 13536 | 13536 |
| 13 | 12960 | 13536 | 13536 | 14112 | 14112 | 14688 | 14688 | 14688 | 15264 | 15264 |
| 14 | 14688 | 14688 | 15264 | 15264 | 15840 | 15840 | 16416 | 16416 | 16992 | 16992 |
| 15 | 15840 | 15840 | 16416 | 16416 | 16992 | 16992 | 17568 | 17568 | 18336 | 18336 |
| 16 | 16416 | 16992 | 16992 | 17568 | 17568 | 18336 | 18336 | 19080 | 19080 | 19848 |
| 17 | 18336 | 19080 | 19080 | 19848 | 19848 | 20616 | 20616 | 20616 | 21384 | 21384 |
| 18 | 19848 | 20616 | 21384 | 21384 | 22152 | 22152 | 22920 | 22920 | 23688 | 23688 |
| 19 | 22152 | 22152 | 22920 | 22920 | 23688 | 24496 | 24496 | 25456 | 25456 | 25456 |
| 20 | 23688 | 24496 | 24496 | 25456 | 25456 | 26416 | 26416 | 27376 | 27376 | 28336 |
| 21 | 25456 | 26416 | 26416 | 27376 | 27376 | 28336 | 28336 | 29296 | 29296 | 30576 |
| 22 | 27376 | 28336 | 28336 | 29296 | 29296 | 30576 | 30576 | 31704 | 31704 | 32856 |
| 23 | 29296 | 29296 | 30576 | 30576 | 31704 | 31704 | 32856 | 32856 | 34008 | 34008 |
| 24 | 31704 | 31704 | 32856 | 32856 | 34008 | 34008 | 35160 | 35160 | 36696 | 36696 |
| 25 | 32856 | 32856 | 34008 | 34008 | 35160 | 35160 | 36696 | 36696 | 37888 | 37888 |
| 26 | 37888 | 37888 | 39232 | 40576 | 40576 | 40576 | 42368 | 42368 | 43816 | 43816 |

| $I_{TBS}$ | \multicolumn{10}{c}{$N_{PRB}$} |
| --- | --- | --- | --- | --- | --- | --- | --- | --- | --- | --- |
| | 61 | 62 | 63 | 64 | 65 | 66 | 67 | 68 | 69 | 70 |
| 0 | 1672 | 1736 | 1736 | 1800 | 1800 | 1800 | 1864 | 1864 | 1928 | 1928 |
| 1 | 2216 | 2280 | 2280 | 2344 | 2344 | 2408 | 2472 | 2472 | 2536 | 2536 |
| 2 | 2728 | 2792 | 2856 | 2856 | 2856 | 2984 | 2984 | 3112 | 3112 | 3112 |
| 3 | 3624 | 3624 | 3624 | 3752 | 3752 | 3880 | 3880 | 4008 | 4008 | 4136 |
| 4 | 4392 | 4392 | 4584 | 4584 | 4584 | 4776 | 4776 | 4968 | 4968 | 4968 |
| 5 | 5352 | 5544 | 5544 | 5736 | 5736 | 5992 | 5992 | 5992 | 5992 | 6200 |
| 6 | 6456 | 6456 | 6456 | 6712 | 6712 | 6968 | 6968 | 6968 | 7224 | 7224 |
| 7 | 7480 | 7480 | 7736 | 7736 | 7992 | 7992 | 8248 | 8248 | 8504 | 8504 |
| 8 | 8504 | 8760 | 8760 | 9144 | 9144 | 9144 | 9528 | 9528 | 9528 | 9912 |
| 9 | 9528 | 9912 | 9912 | 10296 | 10296 | 10680 | 10680 | 10680 | 11064 | 11064 |
| 10 | 10680 | 11064 | 11064 | 11448 | 11448 | 11448 | 11832 | 11832 | 12216 | 12216 |
| 11 | 12216 | 12576 | 12576 | 12960 | 12960 | 13536 | 13536 | 13536 | 14112 | 14112 |
| 12 | 14112 | 14112 | 14112 | 14688 | 14688 | 15264 | 15264 | 15264 | 15840 | 15840 |
| 13 | 15840 | 15840 | 16416 | 16416 | 16992 | 16992 | 17568 | 17568 | 18336 | 18336 |
| 14 | 17568 | 17568 | 18336 | 18336 | 18336 | 19080 | 19080 | 19848 | 19848 | 19848 |
| 15 | 18336 | 19080 | 19080 | 19848 | 19848 | 20616 | 20616 | 20616 | 21384 | 21384 |
| 16 | 19848 | 19848 | 20616 | 20616 | 21384 | 21384 | 22152 | 22152 | 22152 | 22920 |
| 17 | 22152 | 22152 | 22920 | 22920 | 23688 | 24496 | 24496 | 24496 | 24496 | 25456 |
| 18 | 24496 | 24496 | 24496 | 25456 | 25456 | 26416 | 26416 | 27376 | 27376 | 27376 |
| 19 | 26416 | 26416 | 27376 | 27376 | 28336 | 28336 | 29296 | 29296 | 29296 | 30576 |
| 20 | 28336 | 29296 | 29296 | 29296 | 30576 | 30576 | 31704 | 31704 | 31704 | 32856 |
| 21 | 30576 | 31704 | 31704 | 31704 | 32856 | 32856 | 34008 | 34008 | 35160 | 35160 |
| 22 | 32856 | 34008 | 34008 | 34008 | 35160 | 35160 | 36696 | 36696 | 36696 | 37888 |
| 23 | 35160 | 35160 | 36696 | 36696 | 37888 | 37888 | 37888 | 39232 | 39232 | 40576 |
| 24 | 36696 | 37888 | 37888 | 39232 | 39232 | 40576 | 40576 | 42368 | 42368 | 42368 |
| 25 | 39232 | 39232 | 40576 | 40576 | 40576 | 42368 | 42368 | 43816 | 43816 | 43816 |
| 26 | 45352 | 45352 | 46888 | 46888 | 48936 | 48936 | 48936 | 51024 | 51024 | 52752 |

| $I_{TBS}$ | \multicolumn{10}{c}{$N_{PRB}$} |
| --- | --- | --- | --- | --- | --- | --- | --- | --- | --- | --- |
| | 71 | 72 | 73 | 74 | 75 | 76 | 77 | 78 | 79 | 80 |
| 0 | 1992 | 1992 | 2024 | 2088 | 2088 | 2088 | 2152 | 2152 | 2216 | 2216 |
| 1 | 2600 | 2600 | 2664 | 2728 | 2728 | 2792 | 2792 | 2856 | 2856 | 2856 |
| 2 | 3240 | 3240 | 3240 | 3368 | 3368 | 3368 | 3496 | 3496 | 3496 | 3624 |
| 3 | 4136 | 4264 | 4264 | 4392 | 4392 | 4392 | 4584 | 4584 | 4584 | 4776 |
| 4 | 5160 | 5160 | 5160 | 5352 | 5352 | 5544 | 5544 | 5544 | 5736 | 5736 |
| 5 | 6200 | 6200 | 6456 | 6456 | 6712 | 6712 | 6712 | 6968 | 6968 | 6968 |
| 6 | 7480 | 7480 | 7736 | 7736 | 7736 | 7992 | 7992 | 8248 | 8248 | 8248 |
| 7 | 8760 | 8760 | 8760 | 9144 | 9144 | 9144 | 9528 | 9528 | 9528 | 9912 |
| 8 | 9912 | 9912 | 10296 | 10296 | 10680 | 10680 | 10680 | 11064 | 11064 | 11064 |
| 9 | 11064 | 11448 | 11448 | 11832 | 11832 | 11832 | 12216 | 12216 | 12576 | 12576 |
| 10 | 12576 | 12576 | 12960 | 12960 | 12960 | 13536 | 13536 | 13536 | 14112 | 14112 |
| 11 | 14112 | 14688 | 14688 | 14688 | 15264 | 15264 | 15840 | 15840 | 15840 | 16416 |

TABLE 2-continued

| $I_{TBS}$ | | | | | | | | | | |
|---|---|---|---|---|---|---|---|---|---|---|
| 12 | 16416 | 16416 | 16416 | 16992 | 16992 | 17568 | 17568 | 17568 | 18336 | 18336 |
| 13 | 18336 | 18336 | 19080 | 19080 | 19080 | 19848 | 19848 | 19848 | 20616 | 20616 |
| 14 | 20616 | 20616 | 20616 | 21384 | 21384 | 22152 | 22152 | 22152 | 22920 | 22920 |
| 15 | 22152 | 22152 | 22152 | 22920 | 22920 | 23688 | 23688 | 23688 | 24496 | 24496 |
| 16 | 22920 | 23688 | 23688 | 24496 | 24496 | 24496 | 25456 | 25456 | 25456 | 26416 |
| 17 | 25456 | 26416 | 26416 | 26416 | 27376 | 27376 | 27376 | 28336 | 28336 | 29296 |
| 18 | 28336 | 28336 | 29296 | 29296 | 29296 | 30576 | 30576 | 30576 | 31704 | 31704 |
| 19 | 30576 | 30576 | 31704 | 31704 | 32856 | 32856 | 34008 | 34008 | 34008 |
| 20 | 32856 | 34008 | 34008 | 34008 | 35160 | 35160 | 35160 | 36696 | 36696 | 36696 |
| 21 | 35160 | 36696 | 36696 | 36696 | 37888 | 37888 | 39232 | 39232 | 39232 | 40576 |
| 22 | 37888 | 39232 | 39232 | 40576 | 40576 | 40576 | 42368 | 42368 | 42368 | 43816 |
| 23 | 40576 | 40576 | 42368 | 42368 | 43816 | 43816 | 43816 | 45352 | 45352 | 45352 |
| 24 | 43816 | 43816 | 45352 | 45352 | 45352 | 46888 | 46888 | 46888 | 48936 | 48936 |
| 25 | 45352 | 45352 | 46888 | 46888 | 46888 | 48936 | 48936 | 48936 | 51024 | 51024 |
| 26 | 52752 | 52752 | 55056 | 55056 | 55056 | 55056 | 57336 | 57336 | 57336 | 59256 |

| | $N_{PRB}$ | | | | | | | | | |
|---|---|---|---|---|---|---|---|---|---|---|
| $I_{TBS}$ | 81 | 82 | 83 | 84 | 85 | 86 | 87 | 88 | 89 | 90 |
| 0 | 2280 | 2280 | 2280 | 2344 | 2344 | 2408 | 2408 | 2472 | 2472 | 2536 |
| 1 | 2984 | 2984 | 2984 | 3112 | 3112 | 3112 | 3240 | 3240 | 3240 | 3240 |
| 2 | 3624 | 3624 | 3752 | 3752 | 3880 | 3880 | 3880 | 4008 | 4008 | 4008 |
| 3 | 4776 | 4776 | 4776 | 4968 | 4968 | 4968 | 5160 | 5160 | 5160 | 5352 |
| 4 | 5736 | 5992 | 5992 | 5992 | 5992 | 6200 | 6200 | 6200 | 6456 | 6456 |
| 5 | 7224 | 7224 | 7224 | 7480 | 7480 | 7480 | 7736 | 7736 | 7736 | 7992 |
| 6 | 8504 | 8504 | 8760 | 8760 | 8760 | 9144 | 9144 | 9144 | 9144 | 9528 |
| 7 | 9912 | 9912 | 10296 | 10296 | 10296 | 10680 | 10680 | 10680 | 11064 | 11064 |
| 8 | 11448 | 11448 | 11448 | 11832 | 11832 | 12216 | 12216 | 12576 | 12576 |
| 9 | 12960 | 12960 | 12960 | 13536 | 13536 | 13536 | 13536 | 14112 | 14112 | 14112 |
| 10 | 14112 | 14688 | 14688 | 14688 | 14688 | 15264 | 15264 | 15264 | 15840 | 15840 |
| 11 | 16416 | 16416 | 16992 | 16992 | 16992 | 17568 | 17568 | 17568 | 18336 | 18336 |
| 12 | 18336 | 19080 | 19080 | 19080 | 19080 | 19848 | 19848 | 20616 | 20616 | 20616 |
| 13 | 20616 | 21384 | 21384 | 21384 | 22152 | 22152 | 22152 | 22920 | 22920 | 22920 |
| 14 | 22920 | 23688 | 23688 | 24496 | 24496 | 24496 | 25456 | 25456 | 25456 | 25456 |
| 15 | 24496 | 25456 | 25456 | 25456 | 26416 | 26416 | 26416 | 27376 | 27376 | 27376 |
| 16 | 26416 | 26416 | 27376 | 27376 | 27376 | 28336 | 28336 | 28336 | 29296 | 29296 |
| 17 | 29296 | 29296 | 30576 | 30576 | 30576 | 30576 | 31704 | 31704 | 31704 | 32856 |
| 18 | 31704 | 32856 | 32856 | 32856 | 34008 | 34008 | 34008 | 35160 | 35160 | 35160 |
| 19 | 35160 | 35160 | 35160 | 36696 | 36696 | 36696 | 37888 | 37888 | 37888 | 39232 |
| 20 | 37888 | 37888 | 39232 | 39232 | 39232 | 40576 | 40576 | 40576 | 42368 | 42368 |
| 21 | 40576 | 40576 | 42368 | 42368 | 42368 | 43816 | 43816 | 43816 | 45352 | 45352 |
| 22 | 43816 | 43816 | 45352 | 45352 | 45352 | 46888 | 46888 | 46888 | 48936 | 48936 |
| 23 | 46888 | 46888 | 46888 | 48936 | 48936 | 48936 | 51024 | 51024 | 51024 | 51024 |
| 24 | 48936 | 51024 | 51024 | 51024 | 52752 | 52752 | 52752 | 52752 | 55056 | 55056 |
| 25 | 51024 | 52752 | 52752 | 52752 | 55056 | 55056 | 55056 | 55056 | 57336 | 57336 |
| 26 | 59256 | 59256 | 61664 | 61664 | 61664 | 63776 | 63776 | 63776 | 66592 | 66592 |

| | $N_{PRB}$ | | | | | | | | | |
|---|---|---|---|---|---|---|---|---|---|---|
| $I_{TBS}$ | 91 | 92 | 93 | 94 | 95 | 96 | 97 | 98 | 99 | 100 |
| 0 | 2536 | 2536 | 2600 | 2600 | 2664 | 2664 | 2728 | 2728 | 2728 | 2792 |
| 1 | 3368 | 3368 | 3496 | 3496 | 3496 | 3496 | 3624 | 3624 | 3624 | 3624 |
| 2 | 4136 | 4136 | 4136 | 4264 | 4264 | 4264 | 4392 | 4392 | 4392 | 4584 |
| 3 | 5352 | 5352 | 5352 | 5544 | 5544 | 5544 | 5736 | 5736 | 5736 | 5736 |
| 4 | 6456 | 6456 | 6712 | 6712 | 6712 | 6968 | 6968 | 6968 | 6968 | 7224 |
| 5 | 7992 | 7992 | 8248 | 8248 | 8248 | 8504 | 8760 | 8760 | 8760 | 8760 |
| 6 | 9528 | 9528 | 9528 | 9912 | 9912 | 9912 | 10296 | 10296 | 10296 | 10296 |
| 7 | 11064 | 11448 | 11448 | 11448 | 11448 | 11832 | 11832 | 11832 | 12216 | 12216 |
| 8 | 12576 | 12960 | 12960 | 12960 | 13536 | 13536 | 13536 | 13536 | 14112 | 14112 |
| 9 | 14112 | 14688 | 14688 | 14688 | 15264 | 15264 | 15264 | 15264 | 15840 | 15840 |
| 10 | 15840 | 16416 | 16416 | 16416 | 16992 | 16992 | 16992 | 17568 | 17568 | 17568 |
| 11 | 18336 | 18336 | 19080 | 19080 | 19080 | 19080 | 19848 | 19848 | 19848 | 19848 |
| 12 | 20616 | 21384 | 21384 | 21384 | 21384 | 22152 | 22152 | 22152 | 22920 | 22920 |
| 13 | 23688 | 23688 | 23688 | 24496 | 24496 | 24496 | 25456 | 25456 | 25456 | 25456 |
| 14 | 26376 | 26416 | 26416 | 27376 | 27376 | 28336 | 28336 | 28336 | 28336 |
| 15 | 28336 | 28336 | 28336 | 29296 | 29296 | 29296 | 29296 | 30576 | 30576 | 30576 |
| 16 | 29296 | 30576 | 30576 | 30576 | 30576 | 31704 | 31704 | 31704 | 31704 | 32856 |
| 17 | 32856 | 32856 | 34008 | 34008 | 34008 | 35160 | 35160 | 35160 | 35160 | 36696 |
| 18 | 36696 | 36696 | 36696 | 37888 | 37888 | 37888 | 37888 | 39232 | 39232 | 39232 |
| 19 | 39232 | 39232 | 40576 | 40576 | 40576 | 40576 | 42368 | 42368 | 42368 | 43816 |
| 20 | 42368 | 42368 | 43816 | 43816 | 43816 | 45352 | 45352 | 45352 | 46888 | 46888 |
| 21 | 45352 | 46888 | 46888 | 46888 | 46888 | 48936 | 48936 | 48936 | 48936 | 51024 |
| 22 | 48936 | 48936 | 51024 | 51024 | 51024 | 51024 | 52752 | 52752 | 52752 | 55056 |
| 23 | 52752 | 52752 | 52752 | 55056 | 55056 | 55056 | 55056 | 57336 | 57336 | 57336 |
| 24 | 55056 | 57336 | 57336 | 57336 | 57336 | 59256 | 59256 | 59256 | 61664 | 61664 |
| 25 | 57336 | 59256 | 59256 | 59256 | 61664 | 61664 | 61664 | 61664 | 63776 | 63776 |
| 26 | 66592 | 68808 | 68808 | 68808 | 71112 | 71112 | 71112 | 73712 | 73712 | 75376 |

TABLE 2-continued

| | $N_{PRB}$ | | | | | | | | | |
|---|---|---|---|---|---|---|---|---|---|---|
| $I_{TBS}$ | 101 | 102 | 103 | 104 | 105 | 106 | 107 | 108 | 109 | 110 |
| 0 | 2792 | 2856 | 2856 | 2856 | 2984 | 2984 | 2984 | 2984 | 2984 | 3112 |
| 1 | 3752 | 3752 | 3752 | 3752 | 3880 | 3880 | 3880 | 4008 | 4008 | 4008 |
| 2 | 4584 | 4584 | 4584 | 4584 | 4776 | 4776 | 4776 | 4776 | 4968 | 4968 |
| 3 | 5992 | 5992 | 5992 | 5992 | 6200 | 6200 | 6200 | 6200 | 6456 | 6456 |
| 4 | 7224 | 7224 | 7480 | 7480 | 7480 | 7480 | 7736 | 7736 | 7736 | 7992 |
| 5 | 8760 | 9144 | 9144 | 9144 | 9144 | 9528 | 9528 | 9528 | 9528 | 9528 |
| 6 | 10680 | 10680 | 10680 | 10680 | 11064 | 11064 | 11064 | 11448 | 11448 | 11448 |
| 7 | 12216 | 12576 | 12576 | 12576 | 12960 | 12960 | 12960 | 12960 | 13536 | 13536 |
| 8 | 14112 | 14112 | 14688 | 14688 | 14688 | 14688 | 15264 | 15264 | 15264 | 15264 |
| 9 | 15840 | 16416 | 16416 | 16416 | 16416 | 16992 | 16992 | 16992 | 16992 | 17568 |
| 10 | 17568 | 18336 | 18336 | 18336 | 18336 | 18336 | 19080 | 19080 | 19080 | 19080 |
| 11 | 20616 | 20616 | 20616 | 21384 | 21384 | 21384 | 21384 | 22152 | 22152 | 22152 |
| 12 | 22920 | 23688 | 23688 | 23688 | 23688 | 24496 | 24496 | 24496 | 24496 | 25456 |
| 13 | 26416 | 26416 | 26416 | 26416 | 27376 | 27376 | 27376 | 27376 | 28336 | 28336 |
| 14 | 29296 | 29296 | 29296 | 29296 | 30576 | 30576 | 30576 | 30576 | 31704 | 31704 |
| 15 | 30576 | 31704 | 31704 | 31704 | 31704 | 32856 | 32856 | 32856 | 34008 | 34008 |
| 16 | 32856 | 32856 | 34008 | 34008 | 34008 | 34008 | 35160 | 35160 | 35160 | 35160 |
| 17 | 36696 | 36696 | 36696 | 37888 | 37888 | 37888 | 39232 | 39232 | 39232 | 39232 |
| 18 | 40576 | 40576 | 40576 | 40576 | 42368 | 42368 | 42368 | 42368 | 43816 | 43816 |
| 19 | 43816 | 43816 | 43816 | 45352 | 45352 | 45352 | 46888 | 46888 | 46888 | 46888 |
| 20 | 46888 | 46888 | 48936 | 48936 | 48936 | 48936 | 48936 | 51024 | 51024 | 51024 |
| 21 | 51024 | 51024 | 51024 | 52752 | 52752 | 52752 | 52752 | 55056 | 55056 | 55056 |
| 22 | 55056 | 55056 | 55056 | 57336 | 57336 | 57336 | 57336 | 59256 | 59256 | 59256 |
| 23 | 57336 | 59256 | 59256 | 59256 | 59256 | 61664 | 61664 | 61664 | 61664 | 63776 |
| 24 | 61664 | 61664 | 63776 | 63776 | 63776 | 63776 | 66592 | 66592 | 66592 | 66592 |
| 25 | 63776 | 63776 | 66592 | 66592 | 66592 | 66592 | 68808 | 68808 | 68808 | 71112 |
| 26 | 75376 | 75376 | 75376 | 75376 | 75376 | 75376 | 75376 | 75376 | 75376 | 75376 |

Meanwhile, when a channel state between an eNB and a UE is poor, a relay node may be installed therebetween to provide a radio channel having a better channel state to the UE. In addition, a high rate data channel may be provided and a cell service area may be enlarged by introducing the relay node in a cell boundary area having an inferior channel state. Thus, the relay node is currently widely used as a technique introduced to solve a propagation shadow zone in a wireless communication system.

The past relay node technique was limited to the function of a repeater which simply amplifies signals and transmits the amplified signals, whereas the recent technique has developed into a more intelligent form. Furthermore, the relay node technique is indispensible in decreasing extension costs of an eNB and maintenance costs of a backhaul network, and simultaneously in enlarging service coverage and improving data throughput in future mobile communication systems. As the relay node technique has gradually developed, it is necessary to support a relay node, which is used in a conventional wireless communication system, through a new wireless communication system.

Figure 7:
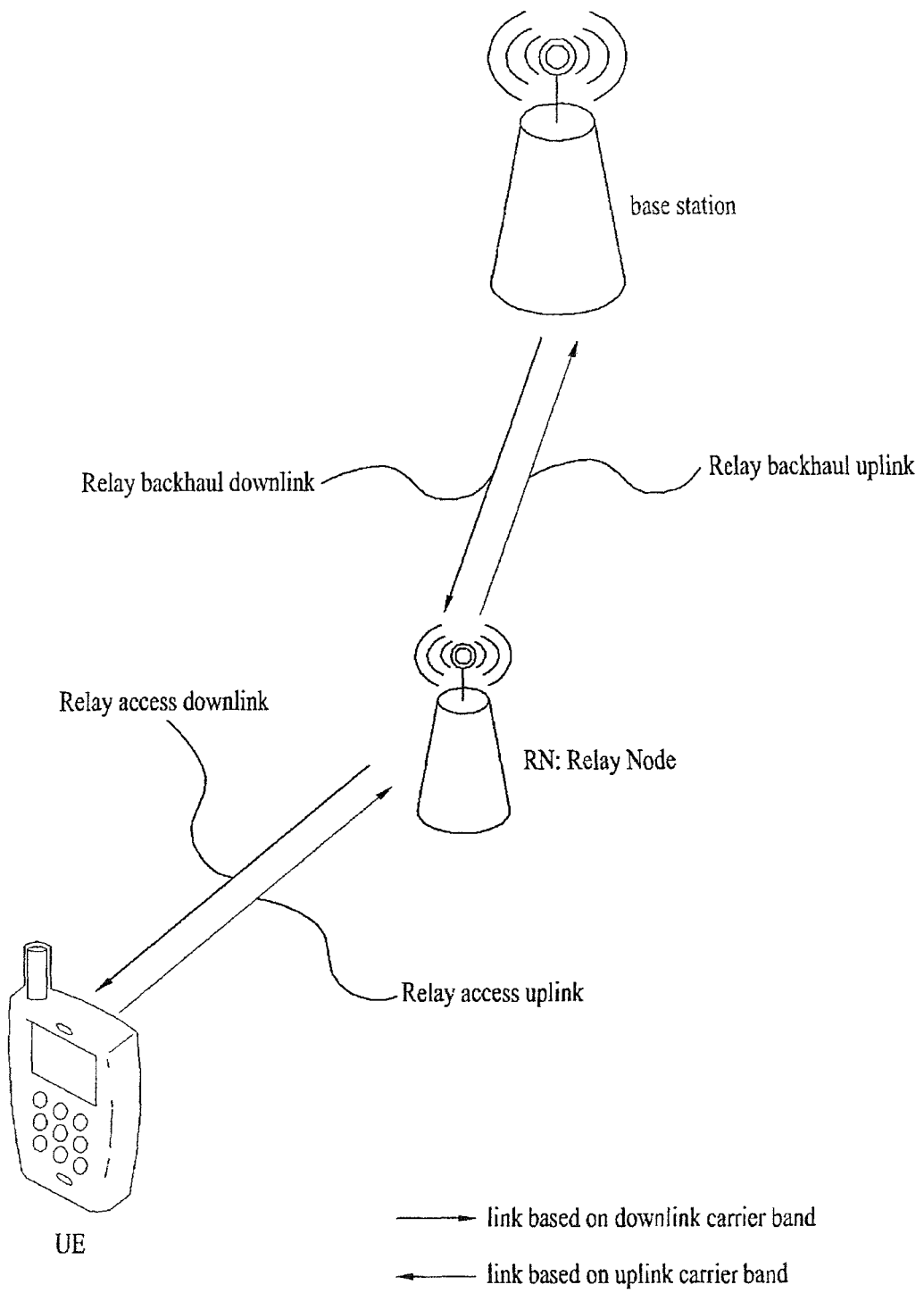
FIG. 7 is a diagram showing the configuration of relay backhaul links and relay access links in a wireless communication system.

FIG. 7 is a diagram showing the configuration of relay backhaul links and relay access links in a wireless communication system.

Referring to FIG. 7, in a 3GPP LTE-A system, two types of links having different attributes are applied to uplink and downlink carrier frequency bands while introducing a role of forwarding a link connection between the eNB and the UE to the relay node. A connection link part established between links of the eNB and the relay node is defined as a backhaul link. Transmission of the backhaul link by a FDD or TDD scheme using downlink resources may be expressed as a backhaul downlink, and transmission by an FDD or TDD scheme using uplink resources may be expressed as a backhaul uplink.

Meanwhile, a connection link part established between a relay node and a series of UEs is defined as a relay access link. Transmission of the relay access link using a downlink frequency band (in the case of FDD) or downlink subframe (in the case of TDD) resources may be expressed as an access downlink, and transmission using an uplink frequency band (in the case of FDD) or uplink subframe (in the case of TDD) resources may be expressed as an access uplink.

The relay node may receive information from an eNB through a relay backhaul downlink and may transmit information to the eNB through a relay backhaul uplink. Further, the relay node may transmit information to the UE through a relay access downlink and may receive information from the UE through a relay access uplink.

In relation to the use of a bandwidth (or spectrum) of the relay node, the case where the backhaul link operates in the same frequency band as the access link is referred to as inband, and the case where the backhaul link operates in different frequency bands from the access link is referred to as outband. In both the inband and the outband, UEs operating according to the existing LTE system (e.g., Release-8), which will be referred to as legacy UEs, should be able to access a donor cell.

The relay node may be classified into a transparent relay node and a non-transparent relay node depending on whether or not the UE recognizes the relay node. In the transparent relay node, the UE is not aware that it is communicating with a network via the relay node, and in the non-transparent relay node, the UE is aware that it is communicating with the network via the relay node.

In relation to control of the relay node, the relay node may be divided into a relay node as part of a donor cell and a relay node for controlling a cell of its own.

The relay node as part of the donor cell may have a relay node ID but does not have a cell ID of its own. If at least part of Radio Resource Management (RRM) is controlled by an eNB to which the donor cell belongs (while parts of the RRM may be located in the relay node), this may be called a relay node as part of the donor cell. Desirably, such a relay node may support legacy UEs. Smart repeaters, decode-and-forward relays, different types of L2 (second layer) relay nodes, and type-2 relay nodes are examples of this type of relay node.

In the case where a relay node is in control of its own cells, the relay node controls one or several cells and a unique physical-layer cell ID is provided to each of the cells controlled by the relay node. The same RRM mechanism is available and in terms of the UE there is no difference in accessing cells controlled by a relay node and cells controlled by a normal eNB. The cells controlled by the relay node may support the legacy UEs. Self-backhauling relay nodes, L3 (third layer) relay nodes, type-1 relay nodes, and type-1a relay nodes are examples of this type of relay node.

A type-1 relay node is an inband relay node and controls a plurality of cells, each of which appears as a separate cell, distinct from the donor cell, to UEs. The plurality of cells has its own physical cell ID (defined in LTE Release-8) and the relay node may transmit its own synchronization channels, reference signals, etc. In the context of single-cell operation, the UE may receive scheduling information and HARQ feedback directly from the relay node and may transmit its own control channels (SR, CQI, ACK/NACK, etc.) to the relay node. The type-1 relay node appears as a legacy eNB (an eNB operating according to LTE Release-8) to legacy UEs (UEs operating according to LTE Release-8). Namely, the type-1 relay node has backward compatibility. Meanwhile, to UEs operating according to an LTE-A system, the type-1 relay node appears as an eNB different from the legacy eNB to allow for performance enhancement.

A type-1a relay node has the same characteristics as the above-mentioned type-1 relay node except that it operates in outband. The operation of the type-1a relay node may be configured to minimize an influence on the operation of an L1 (first layer) or to eliminate such influence.

A type-2 relay node, which is an inband relay node, does not have a separate physical cell ID and thus does not create any new cells. The type-2 relay node is transparent to the legacy UEs, and the legacy UEs are not aware of the presence of the type-2 relay node. The type-2 relay node may transmit a PDSCH but does not transmit a Common Reference Signal (CRS) and a PDCCH.

Meanwhile, in order to allow inband operation of the relay node, some resources in the time-frequency space should be reserved for the backhaul link and may be set not to be used for the access link. This is called resource partitioning.

A general principle for resource partitioning in the relay node is as follows. The backhaul downlink and access downlink may be time division multiplexed in a single carrier frequency (namely, only one of the backhaul downlink and access downlink is activated at a specific time). Similarly, the backhaul uplink and access uplink may be time division multiplexed in a single carrier frequency (namely, only one of the backhaul uplink and access uplink is activated at a specific time).

In multiplexing the backhaul links for FDD, backhaul downlink transmission and backhaul uplink transmission are carried out in a downlink frequency band and an uplink frequency band, respectively. In multiplexing the backhaul links for TDD, backhaul downlink transmission and backhaul uplink transmission are carried out in downlink subframes of the eNB and relay node and uplink subframes of the eNB and relay node, respectively.

In the case of an inband relay node, for example, if reception of the backhaul downlink from the eNB and transmission of the access downlink to the UE are simultaneously performed in a predetermined frequency band, a signal transmitted from a transmitting end of the relay node may be received in a receiving end of the relay node and thus signal interference or Radio Frequency (RF) jamming may occur at an RF front end of the relay node. Similarly, if reception of the access uplink from the UE and transmission of the backhaul uplink to the eNB are simultaneously performed in a predetermined frequency band, signal interference may occur at the RF front end of the relay node. Accordingly, in the relay node, simultaneous transmission and reception in a single frequency band is difficult to achieve unless sufficient separation between a transmission signal and a reception signal is provided (e.g., unless a transmission antenna and a reception antenna are sufficiently separated from each other geographically (for example, by installing them above/below ground)).

One method for solving the problem of signal interference is to allow the relay node not to transmit a signal to UEs while receiving a signal from the donor cell. That is, a gap may be generated in transmission to the UEs from the relay node and the UEs (including the legacy UEs) may be set not to expect any transmission from the relay node during the gap. Such a gap may be set by configuring a Multicast Broadcast Single Frequency Network (MBSFN) subframe.

Figure 8:
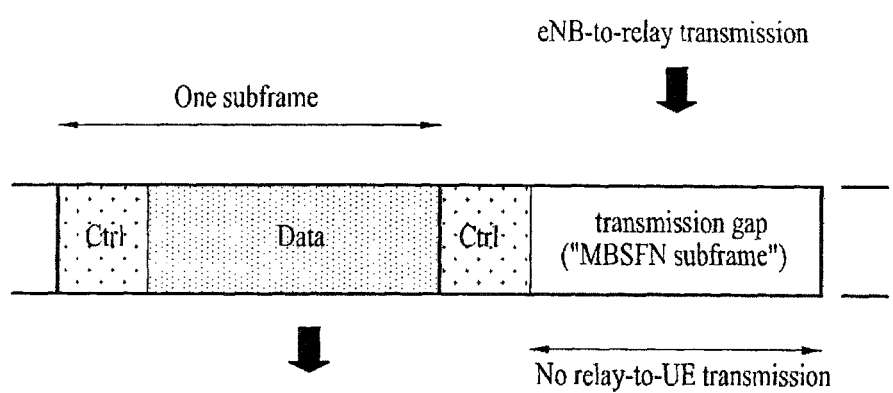
FIG. 8 is a diagram showing relay node resource partitioning.

FIG. 8 is a diagram showing relay node resource partitioning.

In FIG. 8, a first subframe is a general subframe and, in the first subframe, downlink (i.e., access downlink) control signals and data are transmitted to the UE from the relay node. A second subframe is an MBSFN subframe. Control signals are transmitted to the UE from the relay node in a control region of a downlink subframe but no transmission is performed from the relay node to the UE in the other regions of the downlink subframe. In this case, since legacy UEs expect transmission of a PDCCH in all downlink subframes (in other words, since the relay node requires support for legacy UEs within its region to receive the PDCCH every subframe and to perform a measurement function), it is necessary to transmit the PDCCH in all downlink subframes, for correct operation of the legacy UEs. Accordingly, even in a subframe established for transmission of a downlink (i.e., backhaul downlink) to the relay node from the eNB, the relay node needs to transmit the access downlink in the first N (where N=1, 2, or 3) OFDM symbol intervals rather than to receive the backhaul downlink. With regard to this, since the PDCCH is transmitted to the UE from the relay node in the control region of the second subframe, backward compatibility for the legacy UEs served by the relay node may be provided. In the other regions of the second subframe, the relay node may receive transmission from the eNB while no transmission from the relay node to the UE is performed. Through such a resource partitioning scheme, transmission of the access downlink and reception of the backhaul downlink in the inband relay node may not be simultaneously performed.

The second subframe using the MBSFN is described in more detail. The control region of the second subframe may be called a relay node non-hearing interval. During the relay node non-hearing interval, the relay node does not receive a backhaul downlink signal and transmits an access downlink signal. The relay node non-hearing interval may be set to an interval of 1, 2, or 3 OFDM symbols as described above. In the relay node non-hearing interval, the relay node may carry out transmission of the access downlink to the UE, and in the other intervals, it may receive the backhaul downlink from the eNB. In this case, since the relay node cannot perform simultaneous transmission and reception in the same frequency band, the relay node consumes time to change from a transmission mode to a reception mode. Accordingly, a guard time is needed to switch the transmission/reception mode in the first partial interval of a reception region of the backhaul downlink. Similarly, the guard time for switching the transmission/reception mode of the relay node may be set even when the relay node receives the backhaul downlink from the eNB and transmits the access downlink to the UE. The length of the guard time may be given as a value of a time domain, as k (where k≥1) time samples (Ts), or as a length of one or more OFDM symbols. Alternatively, if the relay node backhaul downlink subframes are successively established, or according to a timing alignment relationship of a prescribed subframe, the guard time of the last part of the subframe may be defined or not be established. The guard time may be defined only in a frequency domain which is established for transmission of the backhaul downlink subframe in order to maintain backward compatibility. (If the guard time is established in the access downlink interval, legacy UEs cannot be supported). In the backhaul downlink reception interval except for the guard time, the relay node may receive the PDCCH and PDSCH from the eNB. This may be expressed as Relay-PDCCH (R-PDCCH) and Relay-PDSCH (R-PDSCH) indicating relay node dedicated physical channels.

Figure 9:
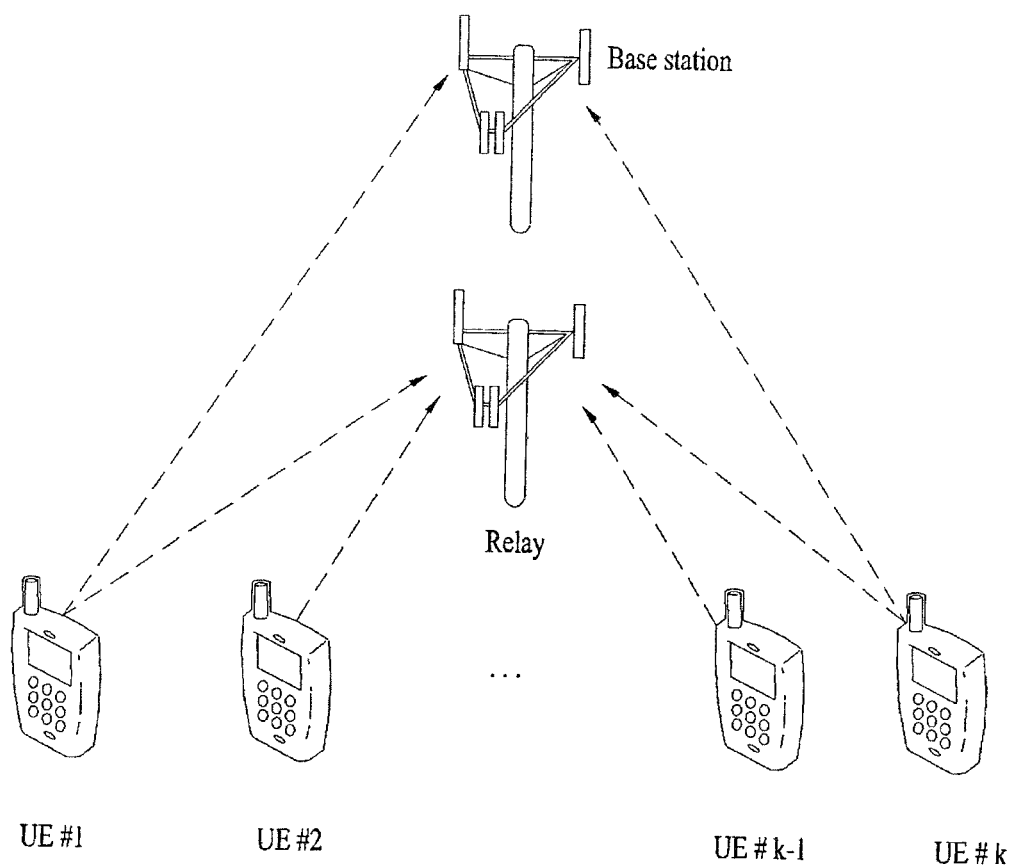
FIG. 9 illustrates a multiple access relay node network shown in a wireless system.

FIG. 9 illustrates a multiple access relay node network shown in a wireless system.

Referring to FIG. 9, K (where, K is the number of user equipment) multiple user equipments (UE) transmit independent data to a base station (eNB), and a relay node(s) perform network coding to enhance the end-to-end error probability.

The relay node and the base station have M (where, M is the number of antennas) antennas. In this case, the communication protocol consists of two phases, where M denotes the number of antennas.

In the first phase, each user equipment is assigned an orthogonal channel, and transmits data to the base station after channel coding. Due to the broadcast nature of the wireless medium, the relay node may also overhear the codewords.

In the second phase, the relay node combines successfully decoded codewords to generate a network coded message, and transmits to the base station. If at least one codeword is received in error at the relay node, it remains silent in the second phase.

Figure 10:
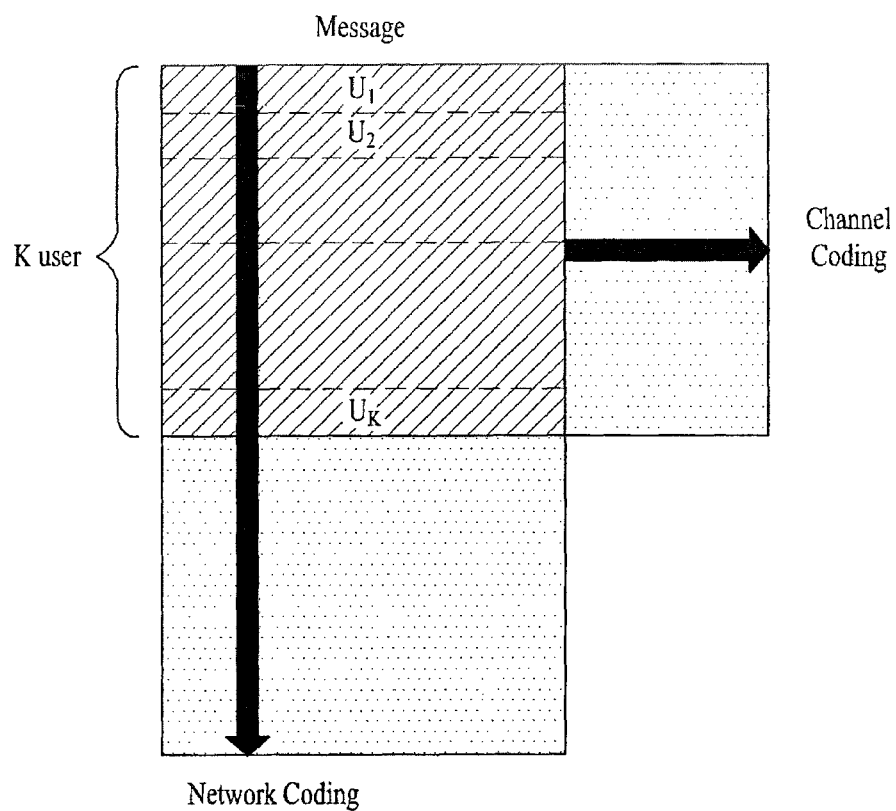
FIG. 10 illustrates conventional network coding used in most multiple access relay node network.

FIG. 10 illustrates conventional network coding used in most multiple access relay node network.

Referring to FIG. 10, Conventional network coding used in most multiple access relay node network usually involves the use of multicomponent network product coding as shown in FIG. 10.

Each user equipment attaches redundant bits (parity) to the message across the row direction by channel coding. The relay node uses all K correctly decoded messages for network coding and generates redundant bits across the column direction, which generates the network product code, where K denotes the number of correctly decoded messages While the multicomponent network product code may be adequate for a small-scale network, they are not optimized for large-scale multiuser network.

First, the reliability of each channel affects the end-to-end error performance in a different manner. The relay node generates the redundant bits based on the correctly decoded messages and the additional gain provided by the relay node decreases corresponding to number of user equipments increases.

Figure 11:
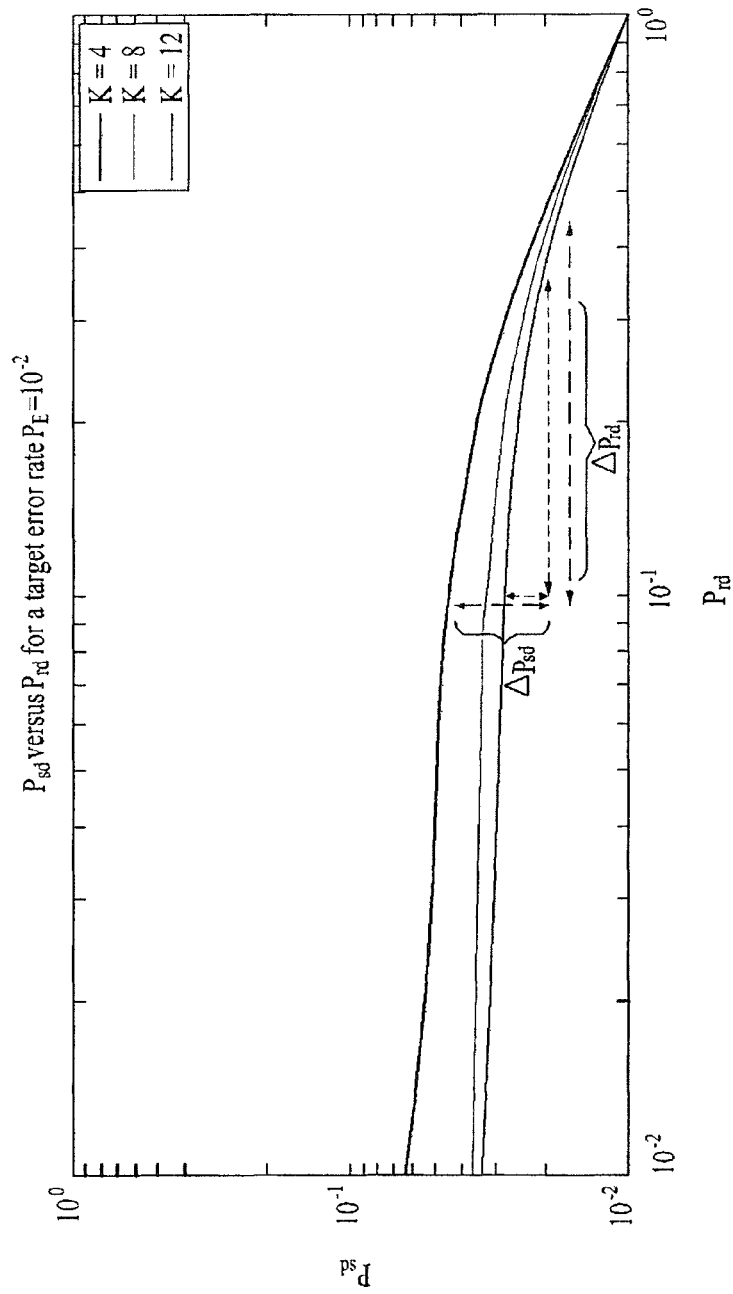
FIG. 11 illustrates the combination of link error probabilities that achieves the target error rate.

FIG. 11 illustrates the combination of link error probabilities that achieves the target error rate.

Referring to FIG. 11, the combination of $P_{sd}$ (user equipment to base station (S-D) link error probability) and $P_{rd}$ (relay node to base station (R-D) link error probability) that achieves the target error probability $P_E = 10^{-2}$. For a given link reliability loss $\Delta P_{rd}$, the required link enhancement $\Delta P_{sd}$ decreases for a larger network.

Hence, the reliability of S-D link is more crucial to the end-to-end error performance than the reliability of R-D link in multi-user network.

Second, in multiuser network, network coding at the intermediate node result in a network coding noise, which is a distortion of the signal by multipath propagation.

This side-effect increases as the number of user equipments K increases. Hence, it is apparent that there exists a need for a technique to incorporate the relative channel condition and the number of user equipments into the conventional network coding scheme.

Accordingly, the present invention proposes a method for subset network coding with multiple antennas by a relay node. The present invention is configured to divide the K messages (i.e. codeword) of UE into multiple subsets and independently combine the messages within the corresponding subset.

The present invention reduces the size of the encoding set and thereby increases the reliability that the network coded parity bits provide across the R-D link.

Figure 12:
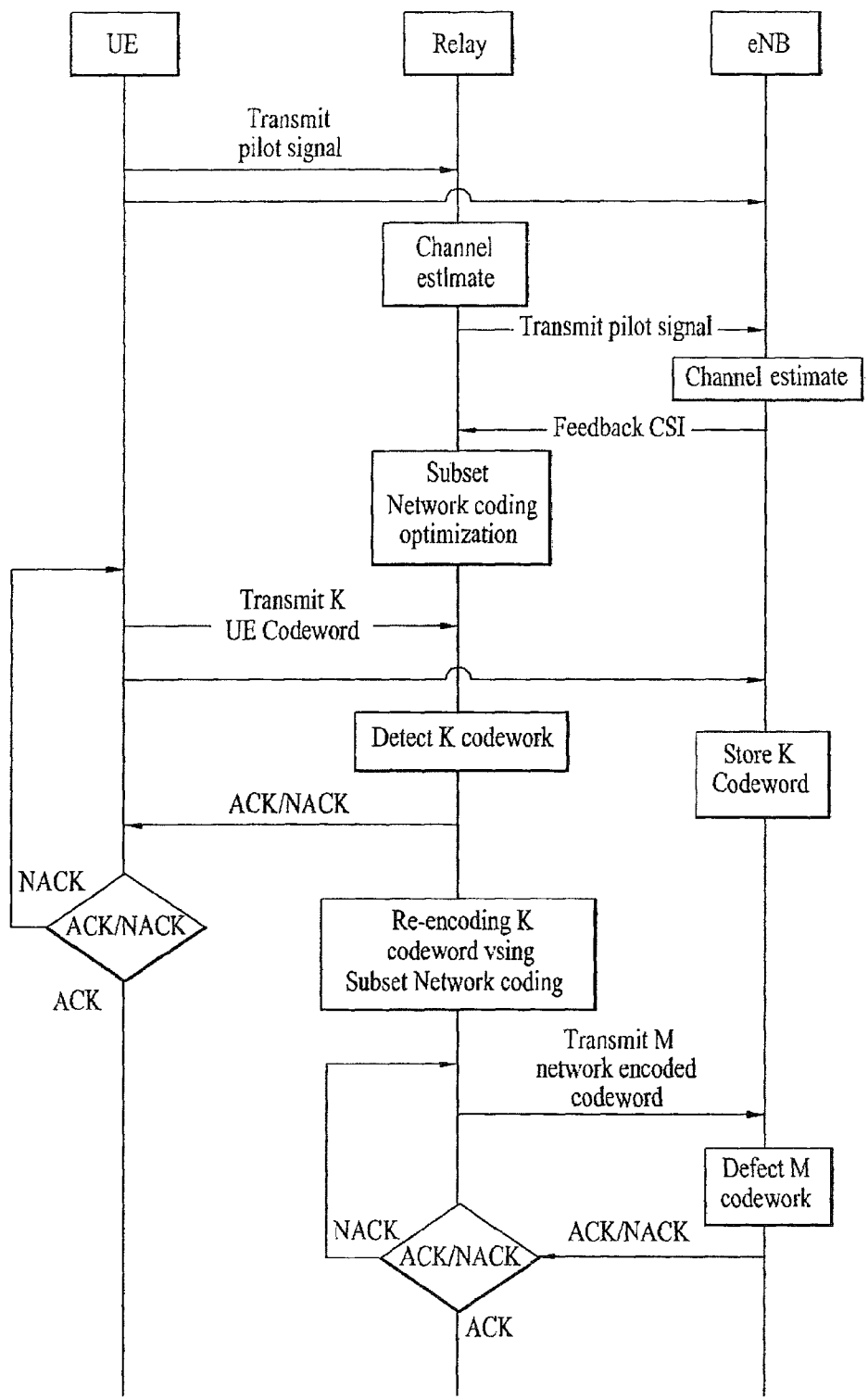
FIG. 12 illustrates the flow chart for subset network coding.

FIGS. 12 to 15 are diagrams explaining subset network coding. FIG. 12 illustrates the flow chart for subset network coding.

Referring to FIG. 12, before data transmission, UE and relay node broadcast the pilot signal and initiate channel estimation at the receiver side.

The base station feedback the channel side information (CSI) to the relay node, and the relay node optimize subset network coding using the CSI information.

The relay node receives K codeword transmitted from UE, and the relay node re-encodes detected K codeword by using network coding. The present invention propose two level FIG. 13 is a diagram explaining high level optimization for subset network coding.

Figure 13:
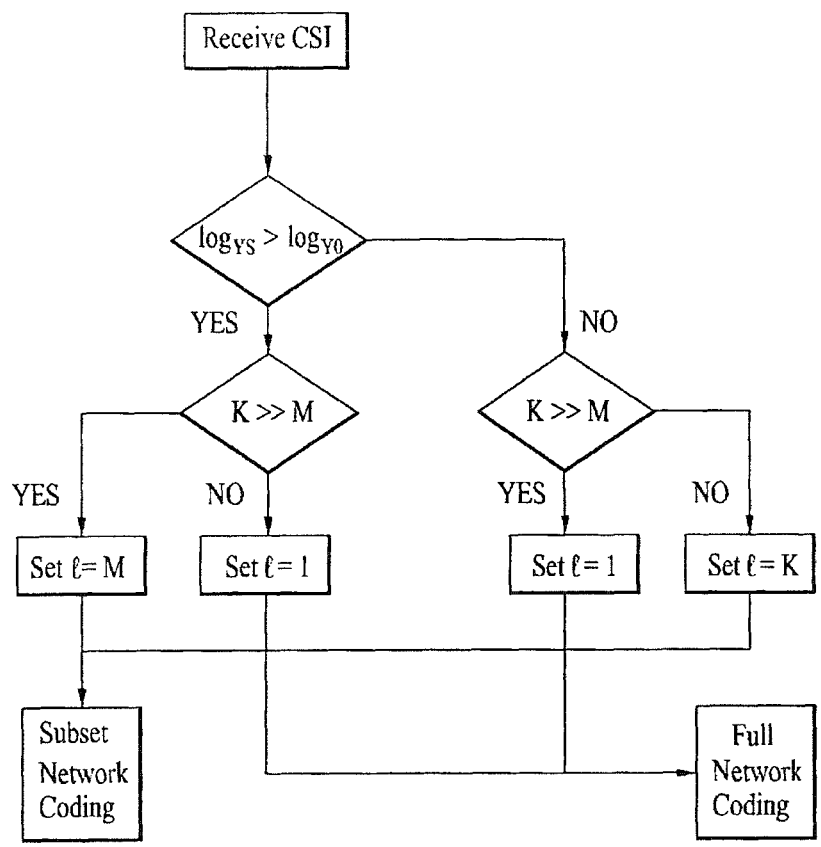
FIG. 13 is a diagram explaining high level optimization for subset network coding.

Referring to FIG. 13, the relay node determines the number of subset l that minimizes the end-to-end outage probability using one-dimensional numerical search based on following equation 1:

$$\min_{1 \le l \le M} [P(\text{out})_l] = \min_l \left[ \sum_{i_1+i_2=0}^{n_s-1} f(i_1, i_2 \mid K, n_s) \right] \quad \text{[Equation 1]}$$

where $n_c = \left\lfloor \frac{K}{l} \right\rfloor$, $n_s = \left\lfloor \frac{M}{l} \right\rfloor$, and $$f(i_1, i_2 \mid K, n_s) = \binom{K-1}{i_1}\binom{n_s}{i_2} p_{ds}^{K-1-i_1}(1-p_{ds})^{i_1} p_{dr}^{n_s-i_2}(1-p_{dr})^{i_2},$$

$$p_{ds} = 1 - \sum_{n=0}^{M-1} \frac{1}{n!}\left(\frac{2^{R_c/M}-1}{\gamma_s}\right)^n \exp\left(-\frac{2^{R_c/M}-1}{\gamma_s}\right),$$

$$p_{dr} = 1 - \sum_{n=0}^{M-1} \frac{1}{n!}\left(\frac{2^{R_c/M}-1}{\gamma_r}\right)^n \exp\left(-\frac{2^{R_c/M}-1}{\gamma_r}\right),$$

$R_c = R(K+1)/K$ (bps/Hz) is the channel rate, $\gamma_s$ is received SNR of the UE symbol at the base station, and $\gamma_r$ is received SNR of the relay symbol at the base station. $P_{ds}$ is the first outage probability and $P_{dr}$ is the second outage probability. $\gamma_o$ is SNR threshold found by Equation 1, as follows Equation 2:

$$\log \gamma_0 \triangleq \frac{\log\left(\binom{K-1}{\frac{K-1}{2}}\binom{n_g}{\frac{n_g}{2}}\right)}{K-1\_n_g - n^*}, n^* = \min(n_s, n_c - 1) \quad \text{[Equation 2]}$$

The present invention simplifies this procedure using approximate analysis and provides high level optimization, whereas the numerical search over 1≤l≤M guarantees minimum end-to-end outage probability and provides low level optimization.

Figure 14:
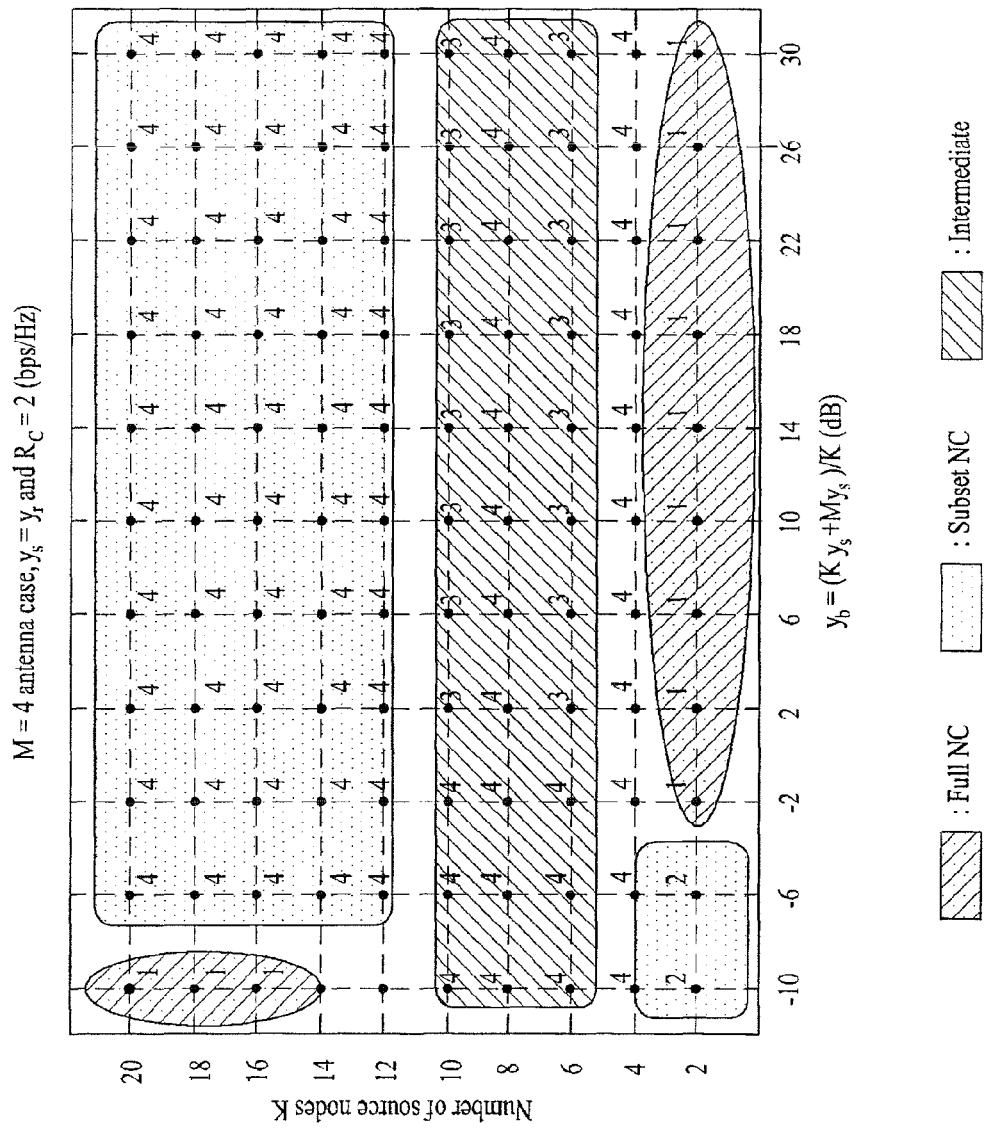
FIG. 14 illustrates the optimized for a given and using the numerical search.

FIG. 14 illustrates the optimized 1 for a given K and $\gamma_s$ using the numerical search. The present invention can find the subset network coding region (l=M) and full network coding region (l=1) region, but the intermediate region can only be found by low level optimization.

After the subset network coding (l) is determined by the relay node, actual data transmission begins.

In the first phase, each UE is assigned an orthogonal channel, and broadcasts its channel encoded codeword to the base station. Denote $x_i$ the codeword for i-th UE.

Due to the broadcast nature of the wireless medium, the relay node may also overhear the packets. If all K codewords are successfully decoded at the relay node, then they are linearly combined (network coded) and sent to the base station. Otherwise, it remains silent in the second phase.

Figure 15:
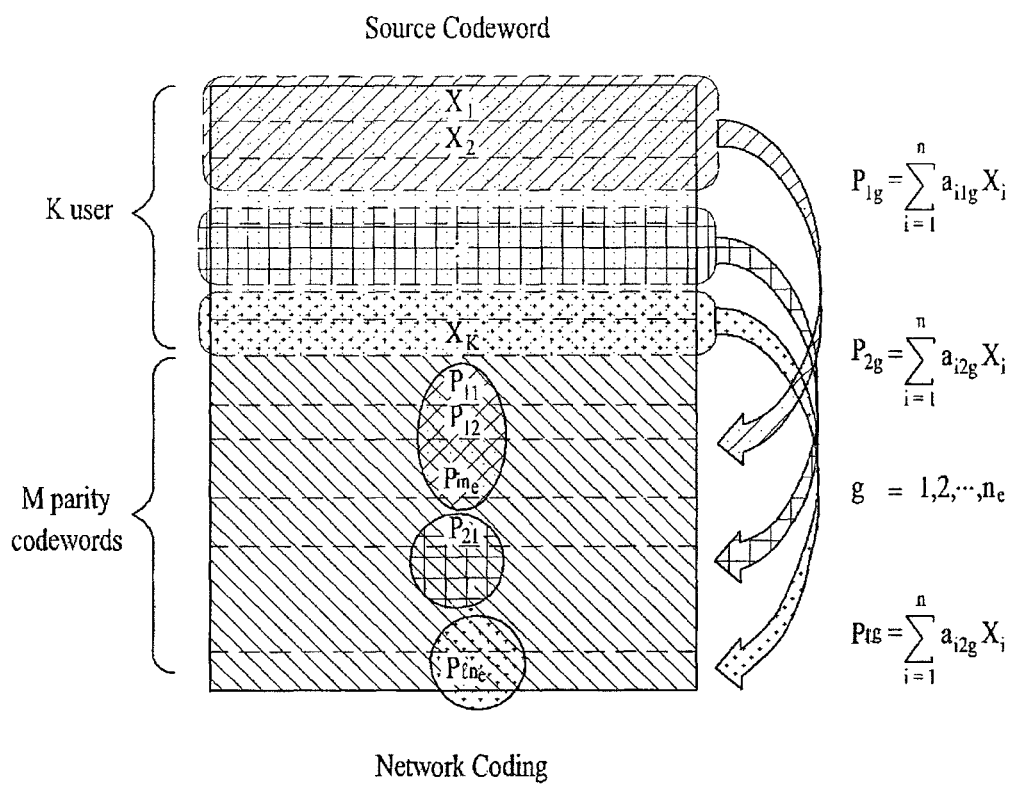
FIGS. 15 and 16 illustrates an embodiment of subset network coding with l subsets.
Figure 16:
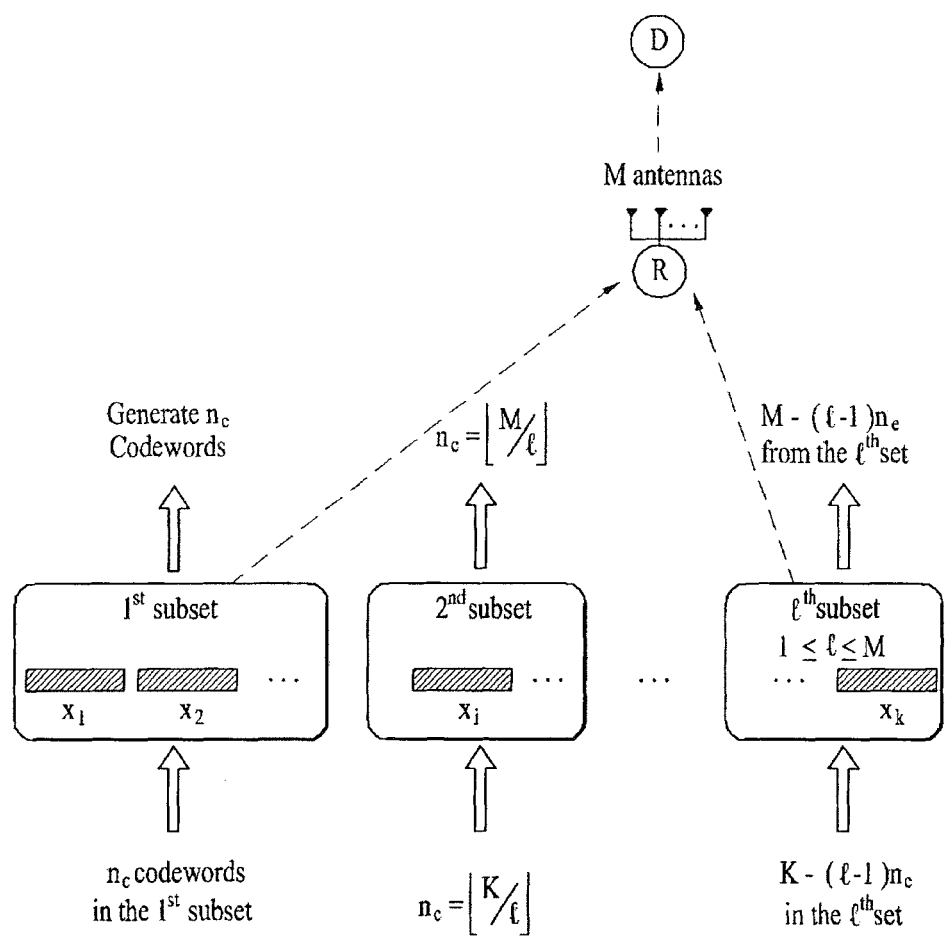

FIGS. 15 and 16 illustrates an embodiment of subset network coding with l subsets.

Referring to FIGS. 15 and 16, the relay node arranges the received K codewords into l subsets where the j-th (1≤j≤l) subset is denoted as $C_j$. The total number of subsets l is an integer, 1≤l≤M, and a design parameter that is determined by optimization subset network coding.

The relay node organizes $$n_c = \left\lfloor \frac{K}{l} \right\rfloor$$

source codewords into each subset $C_j$, 1≤j≤l, and linearly combine the codewords within the set ($x_i \in C_j$) to generate $$n_s = \left\lfloor \frac{M}{l} \right\rfloor$$

network encoded codeword as follows Equation 3:

$$p_{j,g} = \sum_{x_i \in C_j} a_{ijg} x_i, \; 1 \le j \le l, \; 1 \le g \le n_s \quad \text{[Equation 3]}$$

where the network encoding rules are linearly independent to each other and $\alpha_{ijg}$ are the network coding coefficients. For the last l-th subset, the remaining $\overline{n}_c = K - (l-1)n_c$ source codewords are assigned and the codewords within the set $C_l$ generate $\overline{n}_s = M - (l-1)n_s$ network encoded codewords.

Hence, the relay node generates M network encoded codewords that are $$(p_{11}, p_{12}, \ldots, p_{1m_R}, p_{21}, \ldots, p_{ll}, \ldots, p_{l\overline{n}_s})$$

that are simultaneously transmitted to the base station.

Figure 17:
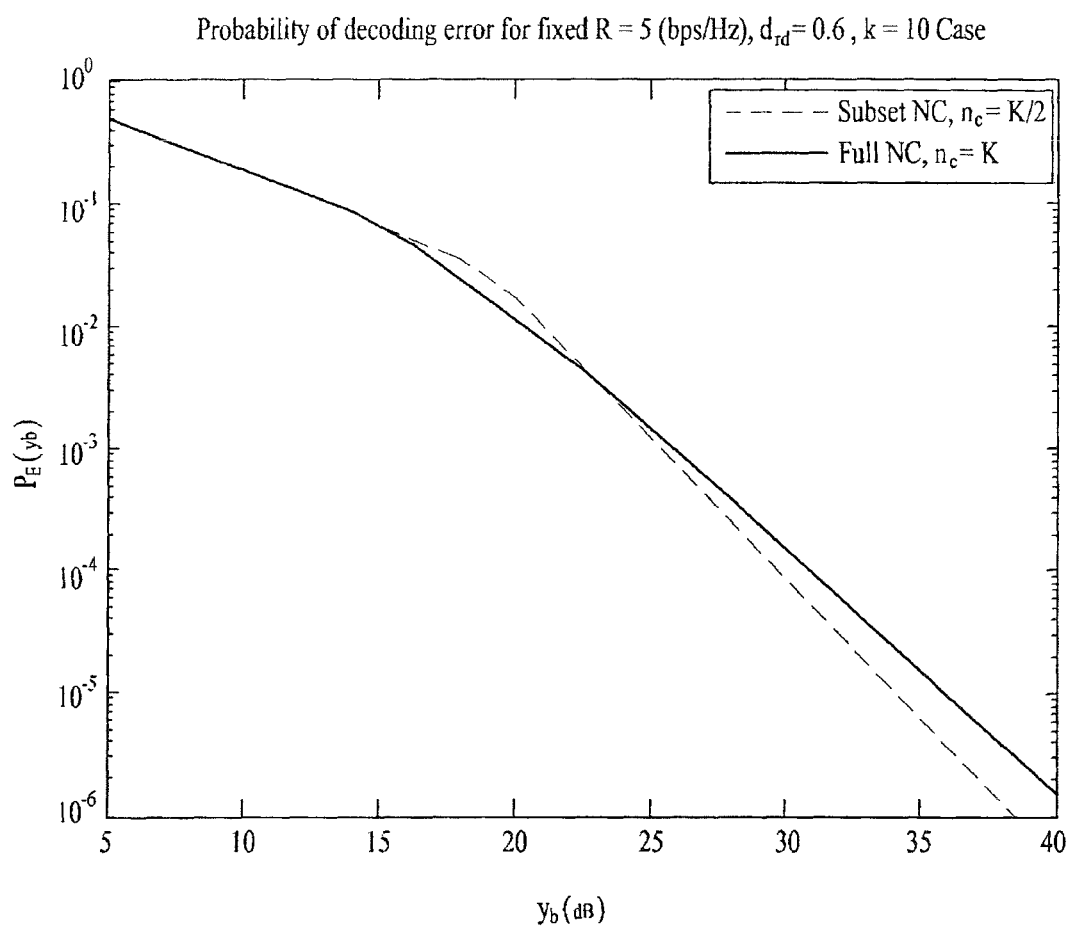
FIG. 17 illustrates the end-to-end outage probability versus received $SNR^{\gamma b}$.

FIG. 17 illustrates the end-to-end outage probability versus received SNRTh.

Referring to FIG. 17, the present invention shows the end-to-end outage probability versus received SNR per information bit $\gamma_b$ with $$\frac{\gamma_r}{\gamma_s}$$

optimized for each $\gamma_b$. If $\gamma_b$ is above a threshold, subset network coding (l=M) provides a lower end-to-end error probability than full network coding (l=1). This enables to optimize the subset network coding for a given channel condition, node location, and SNR level.

Figure 18:
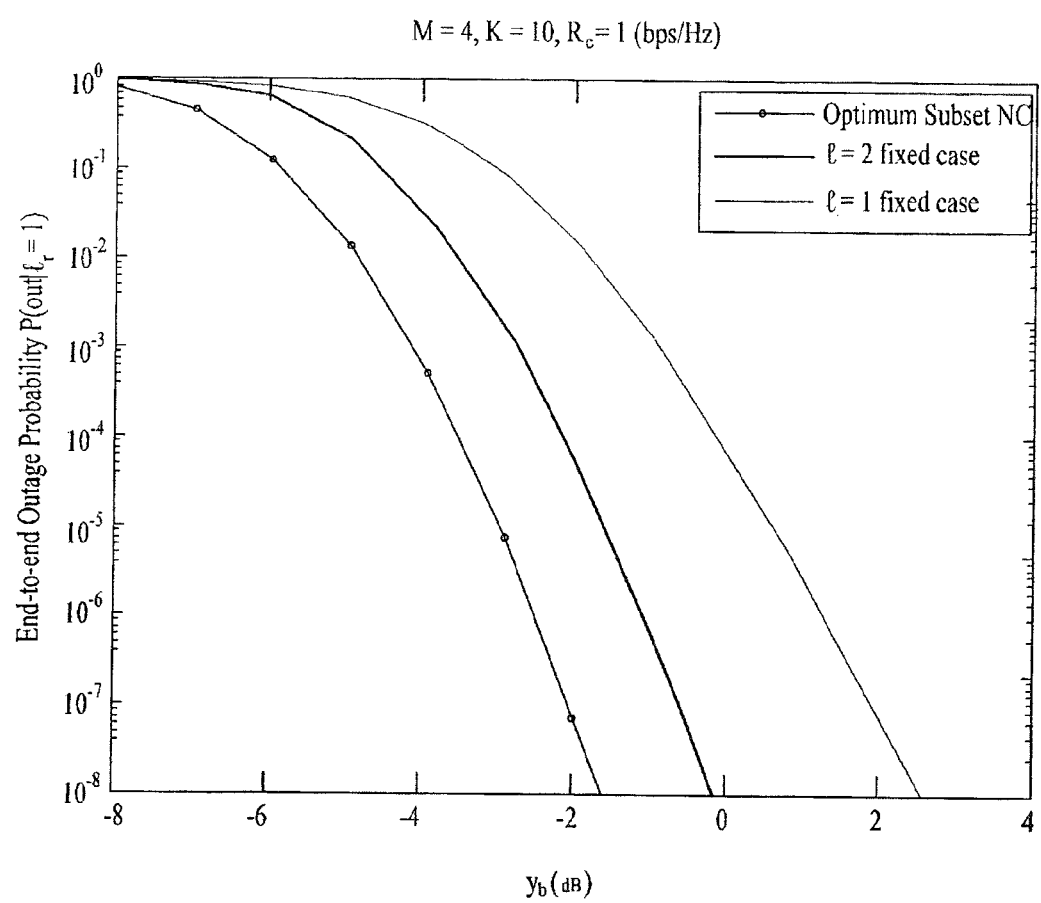
FIG. 18 illustrates comparison between the end-to-end outage probability of optimized subset network coding and that of the conventional network coding.

FIG. 18 illustrates comparison between the end-to-end outage probability of optimized subset network coding and that of the conventional network coding.

Referring to FIG. 18, the diagram shows the end-to-end outage probability of the optimized subset network coding and the conventional network coding schemes. The marked curve optimized the number of subset l for each SNR point, whereas the red curve fixed the number of subset as l=2 and the blue curve fixed the number of subset as l=1. We note that the optimized subset network coding achieve a significant SNR gain, 4 dB for M=4 case.

Figure 19:
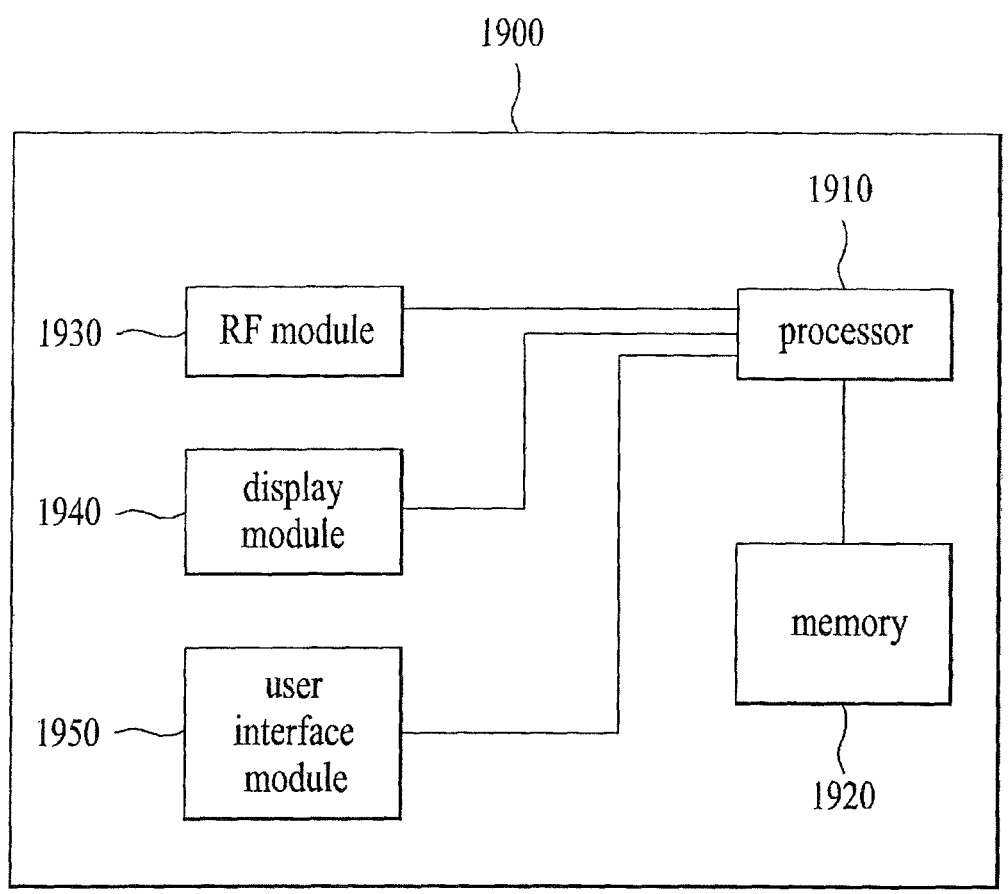
FIG. 19 is a block diagram of a communication device according to an exemplary embodiment of the present invention.

FIG. 19 is a block diagram of a communication device according to an exemplary embodiment of the present invention.

Referring to FIG. 19, a communication device 1900 includes a processor 1910, a memory 1920, an RF module 1930, a display module 1940, and a user interface module 1950.

The communication device 1900 is depicted for convenience of description and may further include necessary modules. Some modules of the communication device 1900 may be further divided into detailed modules. The processor 1910 is configured to operate according to the exemplary embodiments of the present invention described with reference to the drawings. For a detailed description of the operation of the processor 1910, reference may be made to a description in conjunction with FIGS. 1 to 18.

The memory 1920 is connected to the processor 1910 and stores operating systems, applications, program codes, data, and the like. The RF module 1930 is connected to the processor 1910, and converts a baseband signal into a radio signal or the radio signal into the baseband signals. To this end, the RF module 1930 performs analog conversion, amplification, filtering, and frequency up-conversion or performs the inverse of these processes. The display module 1940 is connected to the processor 1910 and displays a variety of information. The display module 1940 uses, but is not limited to, a Liquid Crystal Display (LCD), a Light Emitting Diode (LED), an Organic Light Emitting Diode (OLED), or the like. The user interface module 1950 is connected to the processor 1910 and may be configured by a combination of user interfaces such as a keypad, a touch screen, etc.

The above-described exemplary embodiments are combinations of elements and features of the present invention. The elements or features may be considered selective unless otherwise mentioned. Each element or feature may be practiced without being combined with other elements or features. Further, the embodiments of the present invention may be constructed by combining parts of the elements and/or features. Operation orders described in the embodiments of the present invention may be rearranged. Some constructions of any one embodiment may be included in another embodiment and may be replaced with corresponding constructions of another embodiment. It is apparent that the embodiments may be constructed by a combination of claims which do not have an explicit cited relation in the appended claims or may include new claims by amendment after application.

In the present document, a description has been made of a data transmission and reception relationship between a relay node and an eND. Here, a specific operation described as performed by the eNB may be performed by an upper node of the eNB. Namely, it is apparent that, in a network comprised of a plurality of network nodes including the eNB, various operations performed for communication with the UE may be performed by the eNB, or network nodes other than the eNB. The term 'eNB' may be replaced with the term 'fixed station', 'Node B', 'base station, 'access point', etc.

The exemplary embodiments of the present invention may be achieved by various means, for example, hardware, firmware, software, or a combination thereof. In a hardware configuration, the exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the exemplary embodiments of the present invention may be achieved by a module, a procedure, a function, etc. performing the above-described functions or operations. Software code may be stored in a memory unit and executed by a processor. The memory unit is located at the interior or exterior of the processor and may transmit and receive data to and from the processor via various known means.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

Although the above-described method and apparatus for determining the size of a transport block transmitted by the eNB to the relay node in the wireless communication system has been described as applied to the 3GPP LE system, they may applied to various multiple antenna wireless communication systems in addition to the 3GPP LTE system.

The invention claimed is:

1. A method for network coding by a relay node in a wireless communication system, the method comprising:
receiving an information associated with channel estimation from a base station;
determining a number of subset for network coding based on the information associated with channel estimation;
receiving at least one codeword from at least one user equipment; and
generating re-encoded codeword by network coding based on the number of subset,
wherein the number of subset is calculated based on a first outage probability and a second outage probability, and
wherein the first outage probability is outage probability of the user Equipment to the base station, and the second outage probability is outage probability of the relay node to the base station.

2. The method according to claim 1, wherein the information associated with channel estimation is channel side information.

3. The method according to claim 1, wherein the number of subset is determined by using numerical search.

4. The method according to claim 3, wherein the number of subset is determined based on the following Equation 1:

$$\min_{1 \leq l \leq M} [P(\text{out})_l] = \min_l \left[ \sum_{i_1+i_2=0}^{n_s-1} f(i_1, i_2 \mid K, n_s) \right] \quad \text{[Equation 1]}$$

(Where l is the number of subset, M is the number of network encoded codewords, p is parity of network encoded codewords, K is the number of user equipment, $$n_s = \left\lfloor \frac{M}{l} \right\rfloor,$$

$$f(i_1, i_2 \mid K, n_s) = \binom{K-1}{i_1}\binom{n_s}{i_2} p_{ds}^{K-1-i_1}(1-p_{ds})^{i_1} p_{dr}^{n_s-i_2}(1-p_{dr})^{i_2},$$

$P_{ds}$ is the first outage probability and $P_{dr}$ is the first outage probability).

5. The method according to claim 1, wherein the first outage probability $P_{ds}$ is defined by following equation 2:

$$p_{ds} = 1 - \sum_{n=0}^{M-1} \frac{1}{n!}\left(\frac{2^{R_c}-1}{\gamma_s}\right)^n \exp\left(-\frac{2^{R_c}-1}{\gamma_s}\right) \quad \text{[Equation 2]}$$

(where, M is the number of network encoded codewords, $R_c=R(K+1)/K$ ((bps/Hz) is the channel rate, $\gamma_s$ and $\gamma_r$ is the received SNR per symbol and per relay node symbol).

6. The method according to claim 1, wherein the second outage probability $P_{dr}$ is defined by following equation 3:

$$p_{dr} = 1 - \sum_{n=0}^{M-1} \frac{1}{n!}\left(\frac{2^{R_c/M}-1}{\gamma_r}\right)^n \exp\left(-\frac{2^{R_c/M}-1}{\gamma_r}\right) \quad \text{[Equation 3]}$$

(where, M is the number of network encoded codewords, $R_c=R(K+1)/K$ (bps/Hz) is the channel rate, $\gamma_s$ and $\gamma_r$ is the received SNR per symbol and per relay node symbol).

7. The method according to claim 1, wherein the generating re-encoded codeword by network coding based on the following equation 4:

$$p_{j,g} = \sum_{x_i \in C_j} a_{ijg} x_i, 1 \leq j \leq l, 1 \leq g \leq n_s \quad \text{[Equation 4]}$$

(where, $\alpha_{ijg}$ are the network coefficients, and the j-th ($1 \leq j \leq l$) subset is denoted as $C_j$).

8. The method according to claim 1, wherein the generating re-encoded codeword by subset network coding when the number of subset is not equal to 1.

9. An apparatus for network coding by a relay node in a wireless communication system, the apparatus comprising:

a radio frequency (RF) unit; and
a processor,
wherein the radio frequency unit is configured to receive an information associated with channel estimation from a base station, and to receive at least one codeword from at least one user equipment, and
wherein the processor is configured to determine a number of subset for network coding based on the information associated with channel estimation, and to generate re-encoded codeword by network coding based on the number of subset, and
wherein the number of subset is calculated for a first outage probability and a second outage probability, and
wherein the first outage probability is outage probability of the user Equipment to the base station, and the second outage probability is outage probability of the relay node to the base station.

* * * * *